United States Patent
Praskovsky et al.

(10) Patent No.: US 6,512,996 B1
(45) Date of Patent: Jan. 28, 2003

(54) SYSTEM FOR MEASURING CHARACTERISTIC OF SCATTERERS USING SPACED RECEIVER REMOTE SENSORS

(75) Inventors: Alexander A. Praskovsky, Erie, CO (US); Eleanor A. Praskovskaya, Erie, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 0 days.

(21) Appl. No.: 09/521,401

(22) Filed: Mar. 8, 2000

(51) Int. Cl.[7] .............................................. G01S 13/00
(52) U.S. Cl. ......................................... 702/189; 342/26
(58) Field of Search ........................... 702/189; 342/26, 342/52, 104, 118, 147, 350

(56) References Cited

U.S. PATENT DOCUMENTS

| 4,438,439 A | 3/1984 | Shreve |
| 5,410,314 A | 4/1995 | Frush et al. |

FOREIGN PATENT DOCUMENTS

| EP | 0342529 A2 | 11/1989 |

OTHER PUBLICATIONS

Jarlemark et al., "Characterizations of Temporal Variations in Atmospheric Water Vapor", IEEE, 1998.*
Bobak et al., "Prediction of Water Vapor Scale Height from Integrated Water Vapor Measurements", IEEE, 1996.*
Tanre et al., "Satellite Aerosols Retrieval over Land Surface using the Structure Functions", IEEE, 1992.*
Lixin et al., "Electromagnetic Scattering from a Conducting Target Surrounded by Fractal Atmospheric Turbulence", IEEE, 2000.*
Kutuza et al., "Spatial Inhomogeneities of Rain Brightness Temperature and Averaging Effect for Satellite Microwave Radiometer Observations", IEEE, 1994.*
Peter T. May, "Comments on "VHF Radar Measurements of In–Beam Incidence Angles and Associated Vertical–Beam Radial Velocity Corrections", " Journal of Atmospheric and Oceanic Technology, American Meterological Society, p.
E.L. Sheppard and M.F. Larsen, "Analysis of Model simulations of spaced antenna/radar interferometer," Radio Science, American Geophysical Union, vol. 27 (No. 5), pp. 759–768, (Sep. 14, 1992).
Robert D. Palmer, "Multi–Receiver Techniques for Atmospheric Wind Profiling," Geoscience and Remote Sensing Society Newsletter, pp. 9–17, (Mar. 14, 1994).

(List continued on next page.)

*Primary Examiner*—Patrick Assouad

(57) ABSTRACT

The system for measuring characteristics of scatterers by spaced receiver remote sensors uses a method based on calculation and analysis of the auto- and cross-structure functions for return signals. The method enhances operational capabilities of spaced receiver remote sensors by providing a diverse body of characteristics of scatterers at any elevation angle independently of a type of remote sensor, a type of scatterers, a number of scatterers and their spatial distribution within the illuminated volume. A list of characteristics includes (but is not limited by) the mean speed of scatterers, intensity of the speed fluctuations, and a set of indicators for identification of scatterers. The method is not so sensitive to ground clutter and hard targets as the existing methods are. The method allows to increase an effective signal-to-noise ratio for the existing spaced antenna remote sensors by using significantly overlapping antennas. The method allows to simplify the existing hardware by removing the quadrature-phase synchronous detector although it can be applied to the standard complex output signal.

26 Claims, 9 Drawing Sheets

OTHER PUBLICATIONS

D. Atlas, R.C. Srivastava, "A Method for Radar Turbulence Detection," IEEE Transactions on Aerospace and Electronic Systems, IEEE, vol. AES–7 (No. 1), pp. 179–187, (Jan. 14, 1971).

W. K. Hocking and A.M. Hamza, "A quanititative measure of the degree of anisotropy of turbulence in terms of atmospheric parameters, with particular relevance to radar studies," Journal of Atmospheric and Solar–Terrestrial Physics, Pergamon (Great Britain), vol. 59 (No. 9), pp. 1011–1020, (Apr. 14, 1997).

Keith A. Brewster, Dusan S. Zrnic, "Comparison of Eddy Dissipation Rates from Spatial Spectra of Doppler Veleocities and Doppler Specturm Widths," Journal of Atmospheric and Oceanic Technology, pp. 440–452, (Sep. 14, 1986).

Alan R. Bohne, "Radar Detection of Turbulence in Precipitation Environments," Journal of Atmospheric Sciences, pp. 1819–1837, (Aug. 14, 1982).

W. K. Hocking, "On the extraction of atmospheric turbulence parameters from radar backscatter Doppler spectra–I. Theory," Journal of Atmospheric and Terrestrial Physics, Pergamon Press Ltd. (Great Britain), vol. 45 (No. 2/3), pp. 89–102, (Apr. 14, 1983).

Sergey Y. Matrosov, "Theoretical Study of Radar Polarization Parameters Obtained from Cirrus Clouds," Journal of the Atmoshperic Sciences, American Meterological Society, vol. 48 (No. 8), pp. 1062–1070, (Apr. 15, 1991).

V. Vivekanandan, W. M. Adams, V.N. Bringi, "Rigorous Approach to Polarimetric Radar Modeling of Hydrometeor Orientation Distributions," Journal of Applied Meterology, American Meterological Society, vol. 30 (No. 8), pp. 1053–1063, (Aug. 14, 1991).

B.H. Briggs, "Radar observations of atmospheric winds and turbulence: a comparison of techniques," Journal of Atmospheric and Terrestrial Physics, Pergamon Press Ltd. (Northern Ireland), pp. 823–833, (Apr. 14, 1980).

B.H. Briggs, "The Analysis of Spaced Sensor Records by Correlation Techniques," Middle Atmosphere Program, Handbook for Map, Ground–Based Techniques, University of Illinois (Urbana, Illinois), pp. 166–186, (Nov. 14, 1984).

B.H. Briggs and R.A. Vincent, "Spaced–antenna analysis in the frequency domain," Radio Science, American Geophysical Union, vol. 27 (No. 2), pp. 117–129, (Mar. 14, 1992).

W.L. Clerk, J.L. Green, and J.M. Warnock, "Estimating meterological wind vector components from monostatic Doppler radar measurements: A case study," Radio Science, American Geophysical Union, vol. 20 (No. 6), pp. 1207–1213, (Nov. 14, 1985).

Stephen A Cohn, Christopher L. Holloway, Steven P. Oncley, Richard J. Doviak, and Richard J. Lataitis, "Validation of a UHF spaced antenna wind profiler for high–resolution boundary layer observations," Radio Science, American Geophysical Union, vol. 32 (No. 3), pp. 1279–1296 (May 14, 1997).

R.J. Doviak, S.A. Cohn, C.L. Holoway, and R.J. Lataitis, "Theorectical Comparisons of Spaced Antenna and Doppler Beam Swinging Profiler Performances for Laminar Flow Wind Measurements," Presented at the Eighth International Workshop on Technical and Scientific Aspects of MST Radar (Bangelore, India), pp. 1–10, (Dec. 14, 1998).

Richard J. Doviak, Richard J. Lataitis, Christopher L. Holloway, "Cross correlations and cross spectra for spaced antenna wind profilers," Radio Science, American Geophysical Union, vol. 31 (No. 1), pp. 157–180, (Jan. 14, 1996).

Christopher L. Holloway, Richard J. Doviak, Stephen A. Cohn, Richard J. Lataitis, and Joel S. Van Baelen, "Cross correlations and cross spectra for spaced antenna wind profilers, 2. Algorithms to estimate wind and turbulence," Radio Science, American Geophysical Union, vol. 32 (No. 3), pp. 967–982, (May 14, 1997).

David A. Holdworth and Iain M. Reid, "A simple model of atmospheric radar backscatter: Description and application to the full correlation analysis of spaced antenna data," Radio Science, American Geophysical Union, vol. 30 (No. 4), pp. 1263–1280, (Jul. 14, 1995).

A.N. Kolmogorov, "The local structure of turbulence in incompressible viscous fluid for very large Reynolds numbers," Proc. R. Soc. Lond., No. 434, pp. 9–13, (Apr. 14, 1991).

C.H. Liu, J. Rouger, C.J. Pan, and S.J. Franke, "A model for spaced antenna observational mode for MST radars," Radio Science, American Geophysical Union, vol. 25 (No. 4), pp. 551–563, (Jul. 14, 1990).

Knepp, Dennis, Average received signal power after two–way propagation through ionized turbulence, Radio Science, vol. 32, No. 4, pp. 1575–1596, Jul.–Aug. 1997, Paper No. 97RS00450.

Praskovsky, Alexander A., "Fractal Geometry of Isoconcentration Surfaces in a Smoke Plume" Journal of the Atmospheric Sciences, vol. 53, No. 1, Jan. 1996.

* cited by examiner

SYSTEM FOR MEASURING CHARACTERISTIC OF SCATTERERS USING SPACED RECEIVER REMOTE SENSORS

FIELD OF THE INVENTION

This invention relates to the field of monitoring equipment and to a system for measuring the characteristics of scatterers, that are situated in a predetermined location, by using spaced receiver remote sensors.

PROBLEM

It is a problem in the field of monitoring equipment to accurately measure different characteristics of remotely located scatterers. The scatterers can be located in any of a number of environments, including: the atmosphere, in the ground, in a human body, or any other media, with the determined characteristics of the scatterers being used in the fields of meteorology, weather forecasting, airport environment, geology, agriculture, medicine, astronomy, and the like. Existing monitoring equipment can be divided into two classes: single receiver systems and multiple receiver systems. Each of these classes of remote sensors has advantages and disadvantages which are related to the number of receivers used and the physical limitations of the measurement environment.

A type of standard, widely used single receiver remote sensor system transmits a radio or an acoustic waves, or a light via a single transmitting antenna and a component of this signal, reflected from the scatterers, is received at the single receiving antenna to execute the measurement of characteristics of remotely located scatterers. These single receiver systems include radars, lidars, etc. and are able to measure the projection of the mean speed of scatterers on the direction of transmitted beam, which measurement is also termed the radial velocity of the scatterers. To measure the speed components of the scatterers in a direction that is normal to the direction of transmitted beam, the Velocity Azimuth Display (VAD) technique is used, with a simplified version of Velocity Azimuth Display technique, termed the Doppler Beam Swinging (DBS) technique, being broadly used in practical measurements. The drawbacks of the Velocity Azimuth Display technique and the Doppler Beam Swinging technique are well known and they include: poor spatial resolution: the swinging beam covers a significant volume of space; poor temporal resolution: measurements for at least three beam directions must be taken one after another; possible contamination of the results by ground clutter and/or hard targets when they are present; usage of strong assumptions (spatial homogeneity of the measured speed of the scatterers over the total covered volume, temporal stationarity of the speed of scatterers during all consequent measurements, etc.). These assumptions are typically invalid in the most important measurement situations for atmospheric measurements, including adverse weather conditions and/or in mountainous areas.

The drawbacks of poor spatial resolution and poor temporal resolution can be addressed by using multiple receiver systems, such as Spaced Antenna (SA) remote sensors. These multiple receiver systems have one transmitter and a plurality of antennas to receive components of the transmitted signal reflected from the scatterers (also termed "return signals"). The centers of the antennas are spatially separated, although the antennas can be located very close one to another. The second-order auto- and cross-correlation functions and/or auto- and cross-spectra for the return signals are calculated and analyzed to obtain all components of the mean speed of scatterers. There are several methods for processing the correlation functions or spectra of the return signals to obtain the mean speed of the scatterers. All correlation function or spectra based methods are strongly affected by ground clutter and/or hard targets when these signal contaminants are present, hence, the drawback of possible contamination of the results by ground clutter and/or hard targets is applicable to Spaced Antenna remote sensor systems as well, and in higher extent than to the Velocity Azimuth Display technique and the Doppler Beam Swinging technique noted above. The correlation function or spectra based methods deploy numerous assumptions about statistical characteristics of scattering field, advection speed field, spatial distribution of scatterers within the illuminated volume, etc. One can never check the validity of these assumptions. Hence, limitation of the usage of strong assumptions is also applicable to all present methods of data processing for Spaced Antenna remote sensor systems, and again in higher extent than to the Velocity Azimuth Display technique and the Doppler Beam Swinging technique. Furthermore, the correlation-function-based methods cannot be effectively applied to overlapping receivers, and this makes the signal-to-noise ratio of existing Spaced Antenna systems much lower than that for corresponding Velocity Azimuth Display technique systems and the Doppler Beam Swinging technique systems.

In addition to the limitations of the two classes of existing monitoring equipment noted above, there are other data collection difficulties encountered in measuring characteristics of scatterers. For example, the speed fluctuations with respect to the mean speed of scatterers are referred to as turbulence. Return signals from most remote sensors are spatially weighted averages over a large illuminated volume, and, consequently, over a huge number of individual scatterers. Therefore, a remote sensor system is typically unable to accurately sense fluctuations in the speed of an individual scatterer, hence, a typical remote sensor system cannot directly measure the turbulence parameters even when scatterers are "ideal" tracers. For this reason, there is no exact relation between the parameters of turbulence and the parameters of the return signals. The first drawback of the existing methods for turbulence measurements is that all these methods are based on numerous assumptions of typically unknown validity. The second drawback is that the parameters of the return signals that are used for turbulence measurements, e.g., the spectral width, the rate of fading of correlation functions, etc. are typically estimated indirectly, and at low accuracy, especially at low signal-to-noise ratio. A further limitation of the two classes of existing monitoring equipment is that the standard approach to the identification of scatterers (their shape, orientation, material, distribution, etc.) is to use dual-polarization remote sensors. The reflectivities of differently polarized return signals are used to define the Stokes parameters (basic indicators for identification), and different combinations of the Stokes parameters are used for a specific identification. This standard approach has shown a high degree of accuracy in the identification of scatterers. The drawback of this approach is that in order to utilize it, one needs to deploy a dual-polarization remote sensor.

Therefore, existing methods for measurements of characteristics of scatterers by existing single antenna and spaced antenna remote sensors have several limitations to their abilities, and these limitations complicate the operational use of these methods.

SOLUTION

The above described problems are solved and a technical advance achieved by the present system for measuring characteristics of scatterers using spaced receiver remote sensors which removes the limitations of poor spatial resolution and poor temporal resolution that are found in existing monitoring equipment. The key feature of the system for measuring characteristics of scatterers using spaced receiver remote sensors is the use of structure functions of the return signals instead of correlation functions or spectra of the return signals for retrieval characteristics of the scatterers from the return signals. This allows the system for measuring characteristics of scatterers using spaced receiver remote sensors to remove the above-noted limitations of: the usage of strong assumptions, the inability to use correlation-function-based methods for overlapping receivers, indirect estimation of parameters of return signals that are used for turbulence measurements, the need to deploy a dual-polarization remote sensor for identification of scatterers. The system for measuring characteristics of scatterers using spaced receiver remote sensors also significantly mitigates, if not removes, the limitation of contamination of the results by ground clutter and/or hard targets. The system for measuring characteristics of scatterers using spaced receiver remote sensors is based on a newly developed, asymptotically exact theory for the local structure of the return signals for remote sensors.

The system for measuring characteristics of scatterers using spaced receiver remote sensors addresses the drawback of deploying a dual-polarization remote sensor by providing an alternative set of indicators for the identification of scatterers, using spaced receiver remote sensors with a single polarization. These indicators can be used for identification of the characteristics of the scatterers, or can be used in combination with the Stokes parameters if the system for measuring characteristics of scatterers using spaced receiver remote sensors is able to operate in a dual-polarization mode. While the system for measuring characteristics of scatterers using spaced receiver remote sensors is unable to remove the drawback of the use of numerous assumptions of typically unknown validity, it does provide direct, unambiguous, high-accuracy measurements for the parameters of the return signals that are used to estimate turbulence and, in particular, the turbulence intensity.

The system for measuring characteristics of scatterers using spaced receiver remote sensors produces a predetermined set of scatterer characteristics, where the number and location of receivers in this system depends on the characteristics of the scatterers to be determined, although at least two receivers must be deployed, the return signals from the receivers must be collected with small enough sampling time interval and the signals from all receivers must be correlated. The system is capable of determining various characteristics of scatterers, including but not limited to: the mean speed components, turbulence intensity, size, shape, material, and the like. As shown in flow diagram form in FIG. 1, at step 101, the system is initialized by selecting the averaging time interval and update rate for results, ranges to be analyzed, and the order of structure functions to be calculated and analyzed, depending on characteristics of scatterers to be determined. The method is applied in the same way to all specified ranges over all time intervals. It is preferable to pre-process return signals from each receiver at step 102 to "clean" possible contaminants from the return signals to the maximum extent without effecting the useful information contained in the return signals. Pre-processing of the return signals is accomplished similarly for signals from each receiver, and it may include (although is not limited by) any of a number of known processes: filtering of the random noise; using a clutter removal algorithm(s); removing the mean values from signals; normalizing the signals; and the like.

The auto-structure functions of specified order are then calculated at step 103 for each receiver, and coefficients in the power decomposition of these functions over time separation at the limit of time separation tends to zero are estimated. The major objective of this step is to determine the moments of noise and the effective gain factors of different order. The number of coefficients to be estimated depends on the characteristics of scatterers to be determined. However, at least the zero order coefficients must be estimated for the even order structure functions. These coefficients are necessary to estimate the moments of noise and effective gain factors. Other coefficients provide estimates of turbulence characteristics after the mean speed is estimated.

The next step is to calculate the cross-structure functions for selected pairs of receivers at step 104, and estimate coefficients in the power decomposition of these functions over time separation at the limit of time separation tends to zero. The objective of this step is to estimate all the predetermined characteristics of the scatterers. The number of coefficients to be estimated depends on the characteristics of the scatterers that are to be determined. The zero order coefficients provide indicators for identification of scatterers, the first order coefficients provide the mean speed components, the second order coefficients provide estimates for turbulence characteristics, and so on.

Post-processing is then applied at step 105 to provide the most reliable final estimates for the predetermined characteristics of the scatterers, and, if this is required, statistical errors for each characteristic as well as a measure for reliability of the estimates. This processing step can includes (although it is not limited by) statistical analysis of all obtained estimates for the predetermined characteristics of the scatterers if the remote sensor can produce several estimates for some characteristics; joint statistical analysis of the characteristics of scatterers at the analyzed time interval with those from the previous time interval(s); joint statistical analysis of the characteristics of the scatterers at the analyzed range with those from other close enough ranges; identification of scatterers in accordance with predetermined requirements by using a set of measured indicators; and so on. Post-processing is an optional operation; it may, or may not be applied.

The final and/or intermediate estimates for the predetermined characteristics of the scatterers are displayed at step 106 in any user specified format. The user-specified set of characteristics can also be archived for future use and/or reference.

DETAILED DESCRIPTION

System Architecture

Figure 2:
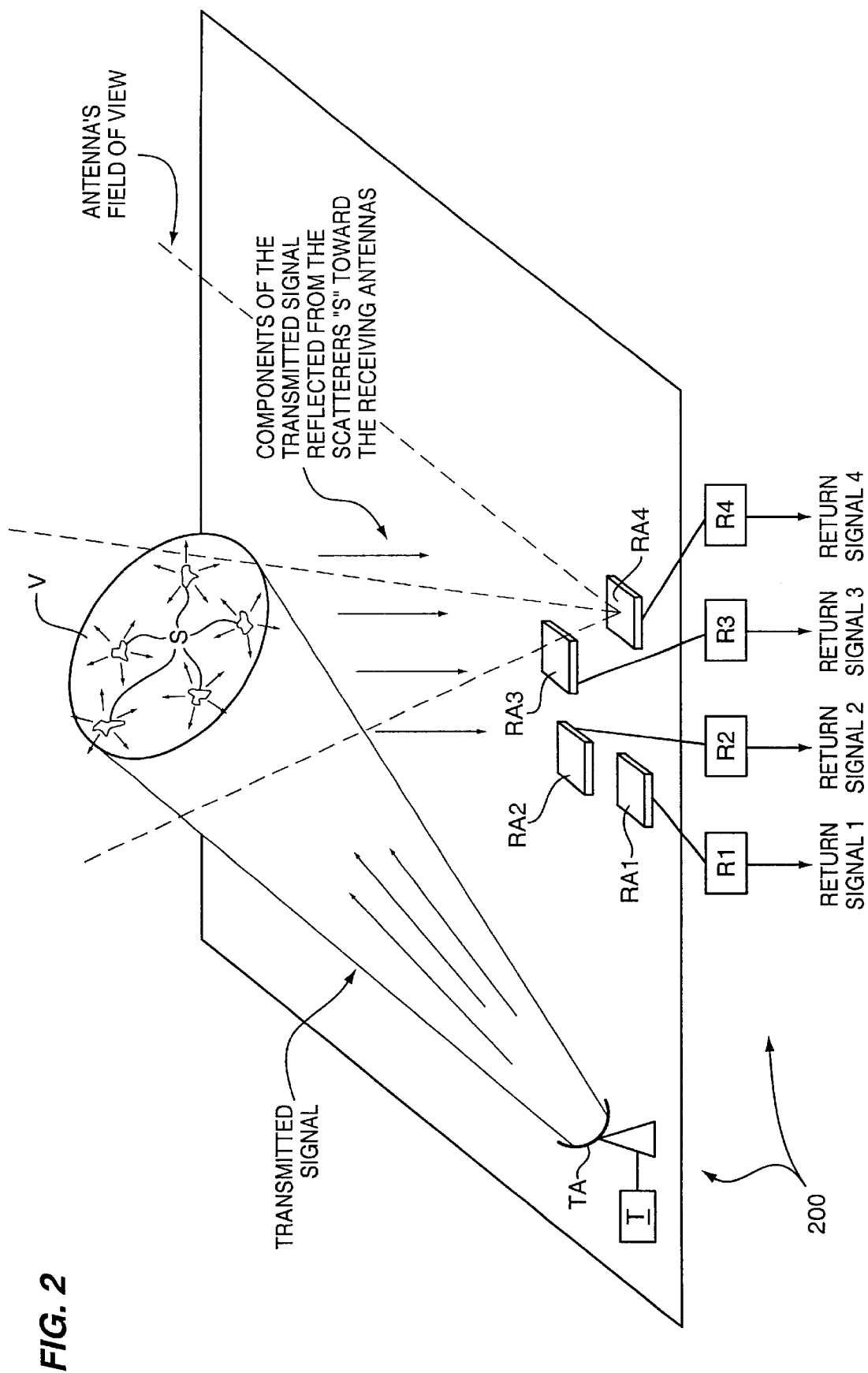
FIG. 2 illustrates in block diagram form the overall architecture of a typical spaced receiver remote sensor system that implements the present system for measuring characteristics of scatterers using spaced receiver remote sensors.

FIG. 2 illustrates in block diagram form the overall architecture of a typical spaced receiver remote sensor system 200 that implements the present system for measuring characteristics of scatterers using spaced receiver remote sensors 101. In particular, this system is shown in the form of a radar based system which uses a transmitter T with a single transmitter antenna TA and a plurality of spaced receivers R1–R4 (four shown in this example) to detect the component of the transmitted signal reflected from scatterers S in a predetermined region of space V. The spaced receiver antennas RA1–RA4 can be implemented as one or more antennas of any geometry and need not be uniform is size, characteristics, or geometry. In this system, a transmitter T transmits a focused beam at the radio or acoustic frequency via the antenna TA into the predefined volume of space V in a predetermined scan pattern, with the beam comprising a series of pulses (or alternatively a continuous signal), each having a pulse origination time as it is emanated from the transmitter T. The transmitted pulses of radio or acoustic frequency are scattered off various targets S which are located in the predetermined volume of space V. The components of the scattered pulses that return to the plurality of spaced receiver antennas RA1–RA4 are received in selected range gates through independent receiving channels R1–R4, and processed to determine the characteristics of the scatterers S. In such a system, the magnitude of the return signals is much less than the magnitude of the transmitted pulses and the return signals may include a contamination component consisting of a noise component of significant magnitude. Therefore, the processing of the return signals entails reduction of the noise component and extracting the information content from the return signals using various signal processing algorithms. The signal processing is directed to processing a plurality of the return signals over a period of time to thereby identify various characteristics of the scatterers, which effect the nature of the scattering that takes place and therefore the characteristics of the return signals. While the description below is based upon a fixed site transmitter and receiver, the system can be implemented on a moving platform, such as an aircraft, and can be implemented to use other than radar pulses, such as a light-based system.

The system for measuring characteristics of scatterers using spaced receiver remote sensors 101 measures characteristics of the scatterers S using a spaced receiver remote sensor with one transmitter T and $N_r \geq 2$ receivers R1–R4 (four shown in the example in FIG. 2). The system is described in the adaptive Cartesian coordinate system with the origin in the center of the transmitting antenna TA, where the z axis is directed along a transmitted beam, and x and y axes are in a plane normal to the beam. Locations of the receiver centers of view are denoted as $\vec{x}_k$, $k=1-N_r$. To simplify the description, a receiver with the center of view in location $\vec{x}_k$ will be referred to as the receiver $\vec{x}_k$. Each receiver provides return signals at specified ranges $R_1$, $R_2$, ... $R_m$ (distances from the transmitter antenna TA) at the sampling time interval $\Delta t = IPP*NCI$ where IPP is the inter-pulse period, NCI is the number of coherent integrations, and M is the number of ranges. Characteristics of the scatterers are estimated as average values over a specified time interval $T_{av} >> \Delta t$ at a specified update rate $T_{ur} \geq \Delta t$. The present system for measuring characteristics of scatterers using spaced receiver remote sensors 101 relates different characteristics of the scatterers S to measurable parameters of structure functions of different order. Depending on the characteristics of the scatterers S that are to be determined, as well as the configuration and parameters of a specific remote sensor, structure functions of different order can be used by the present system for measuring characteristics of scatterers using spaced receiver remote sensors 101 to measure characteristics of the scatterers S, with the following description providing a generalized description of the calculations for structure functions of any order $\rho \geq 2$.

Figure 1:
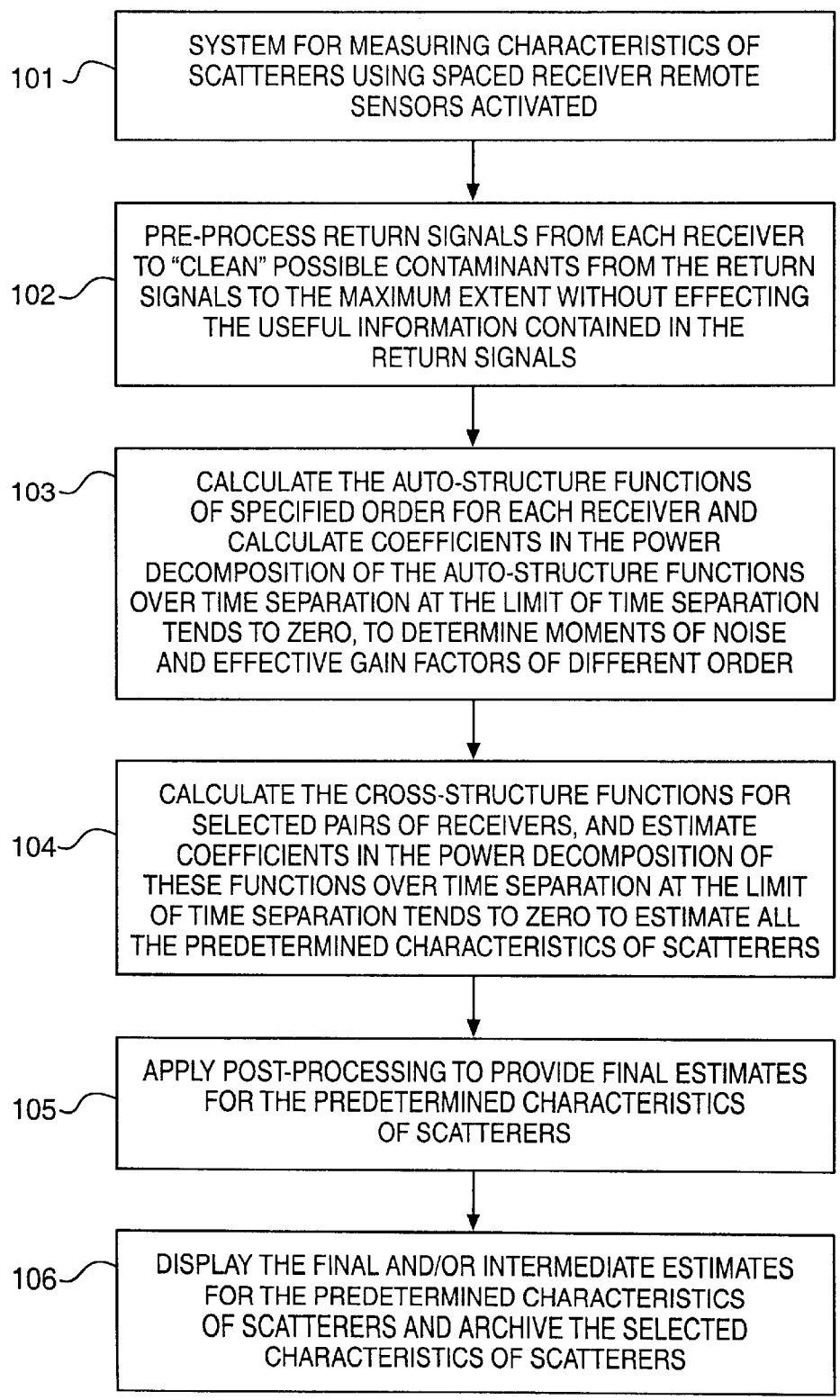
FIG. 1 illustrates a typical data flow for executing the method for measurements of characteristics of scatterers by spaced receiver remote sensors.

This method of computing measurements of characteristics of the scatterers S is applied independently, and in the same way to each specified range R and to each specified time interval $[t_0, t_0+T_{av}]$. A data flow chart for the method for measurements of characteristics of scatterers by spaced receiver remote sensor at any one fixed range R, over any one fixed time interval $[t_0, t_0+T_{av}]$, and at any starting time $t_0$ is presented in FIG. 1 (as characterized above). The return signals $s(\vec{x}_k, t)k$, $t$, $k=1-N_r$, from all receivers $\vec{x}_k$ at any one specified range $R_j$, $j=1-M$, and over any one specified time interval $t \in [t_0, t_0+T_{av}]$ are considered. The signals $s(\vec{x}_k, t)$ are real discrete time series that are obtained at a specified sampling time interval $\Delta t$ (the use of complex return signals is considered below). The angular brackets "<>" denotes time averaging over the interval $[t_0, t_0+T_{av}]$ For a given range R and time interval $[t_0, t_0+T_{av}]$, all time averages are independent of t as well as are all other parameters defined through these averages. However, these averages and other parameters differ for different time intervals (i.e., for different $t_0$ and/or $T_{av}$) and different ranges.

Pre-Processing of the Return Signals for Each Receiver

The objective of the pre-processing at step 102 is to "clean" the returned signals from possible contaminants to the maximum extent until it does not contaminate a useful information contained in the signals. Pre-processing is accomplished similarly for signals from each receiver $k=1-N_r$, and may include (although is not limited by) the following operations:

(a) filtering of the random noise from return signal $s(\vec{x}_k, t)$ if one chooses to apply this option;

(b) using a clutter removal algorithm(s) for return signal $s(\vec{x}_k, t)$ if one chooses to apply this option;

(c) removing the mean value $<s(\vec{x}_k, t)>$ from a signal $s(\vec{x}_k, t)$ to exclude possible offsets;

(d) estimating the signal variance $\sigma^2(\vec{x}_k)=\langle[s(\vec{x}_k,t)-\langle s(\vec{x}_k,t)\rangle]^2\rangle$ and normalizing the signal by its standard deviation $\sigma(\vec{x}_k,t)$ if one chooses to apply this option.

Only operation (c) is necessary for effective application of the present method while others are optional; they may, or may not be used.

Calculation and Analysis of the Auto-structure Functions

The major objective of calculation and analysis of auto-structure functions at step 103 is to determine the moments of noise and the effective gain factors of different order. Several steps should be executed to meet this objective. One should calculate the auto-structure functions of the predetermined order for each receiver $k=1-N_r$. A theoretical definition of the auto-structure function of the order $\rho$ is:

$$D_\rho(\vec{x}_k,T)=\langle[s(\vec{x}_k,t)-s(\vec{x}_k,t+T)]^\rho\rangle \quad \text{Equation 1}$$

Practical techniques for calculating the auto-structure functions are discussed below. The functions $D_\rho(\vec{x}_k,T)$ are relevant to measurements of characteristics of scatterers only at small separations $0<T\leq T_{amax}$.

According to the theory, the auto-structure functions of even $\rho=2i$ and odd $\rho=2i+1$ order (i=1, 2, 3, . . . ) behave at $T\to 0$, $T\neq 0$ as:

$$D_{2i}(\vec{x}_k,T)=2\langle n^{2i}(\vec{x}_k,t)\rangle+\langle d_{t,k}^{2i}\rangle T^{2i} \quad \text{Equation 2}$$

$$D_{2i+1}(\vec{x}_k,T)=-\langle d_{t,k}^{2i+1}\rangle T^{2i+1} \quad \text{Equation 3}$$

where $\langle n^{2i}(\vec{x}_k,t)\rangle$ is the 2i-th order moment of noise component $n(\vec{x}_k,t)$ with zero time correlation lag, $S(\vec{x}_k,t)$ is a pure return signal from scatterers, and $d_{t,k}$ denotes the time derivative of the pure return signal:

$$d_{t,k}=\partial S(\vec{x}_k,t)/\partial t \quad \text{Equation 4}$$

for the receiver $\vec{x}_k$. Contrary to the real return signal $s(\vec{x}_k,t)$, the pure signal $S(\vec{x}_k,t)$ contains no noise, clutter, or any other contaminants. One should estimate the moments of noise $\langle n^{2i}(\vec{x}_k,t)\rangle$ of the even order 2i=1, 2, 3, . . . as limits of the structure functions $D_\rho(\vec{x}_k,T)$, $\rho=2i$, at $T\to 0$. If the list of predetermined characteristics of scatterers requires this, one should estimate the moments $\langle d_{t,k}\rangle$ at the limit of the structure functions $D_\rho(\vec{x}_k,T)$, ρ24, at $T\to 0$.

According to the theory, all statistics of the return signals from identical receivers should be the same if the receivers are located close enough one to another. In practice, one should define the effective gain factors for equalizing the moments of signals from real receivers that might not be fully identical at step 103. To apply the theory to the p-th order structure function, only relative gains should be equalized. One should define the relative gains $g_{km,p}$ for all pairs of receivers $k=1-N_r$ and $m=1-N_r$ as:

$$g_{km,2i}=\frac{g_{k,2i}}{g_{m,2i}}=\left[\frac{\langle s^{2i}(\vec{x}_k,t)\rangle-\langle n^{2i}(\vec{x}_k,t)\rangle}{\langle s^{2i}(\vec{x}_m,t)\rangle-\langle n^{2i}(\vec{x}_m,t)\rangle}\right]^{1/(2i)} \quad \text{Equation 5}$$

for the even order $\rho=2i$, and $$g_{km,2i+1}=\frac{g_{k,2i+1}}{g_{m,2i+1}}=\left[\frac{\langle s^{2i+1}(\vec{x}_k,t)\rangle}{\langle s^{2i+1}(\vec{x}_m,t)\rangle}\right]^{1/(2i+1)} \quad \text{Equation 6}$$

for the odd order $\rho=2i+1$, i=1, 2, 3, . . . , structure functions.

The relative gains for each $\rho$ are constants for each pair k and m. Contrary to physical gains, the effective gain factors $g_{km,p}$ can be different for different ranges and vary with $t_0$ and/or $T_{av}$ for each range. Note that direct estimation of the gain factors for the odd $\rho\rho=2i+1$ with Equation 6 is a procedure of a poor accuracy. To overcome this difficulty in practical measurements, one can use a relation:

$$g_{km,2i+1}=g_{km,2i}, i=1, 2, 3, \quad \text{Equation 7}$$

instead of Equation 6.

One can choose to re-normalize return signals in accordance with the relative gain factors $g_{km,p}$ before calculating the cross-structure functions of the order $\rho$.

Calculation and Analysis of the Cross-Structure Function

The objective of calculation and analysis of cross-structure functions at step 104 is to estimate all the predetermined characteristics of scatterers. Several steps should Abe executed to meet this objective. One should calculate the cross-structure functions of the predetermined order for selected pairs of receivers $k=1-N_r$, $m=1-N_r$. A theoretical definition of the cross-structure function of the order $\rho$ is:

$$D_\rho(\vec{x}_k,\vec{x}_m,T)=\langle[s(\vec{x}_k,t)-g_{km,\rho}s(\vec{x}_m,t+T)]^\rho\rangle \quad \text{Equation 8}$$

For $N_r$ receivers, up to $N_{eq}=N_r(N_r-1)/2$ cross-structure functions can be calculated. The functions $D_\rho(\vec{x}_k, \vec{x}_m, T)$ are relevant to measurements of characteristics of scatterers only at small separations $-T_{cmax}\leq T\leq T_{cmax}$. According to a theory, the cross-structure functions for each pair of receivers $k=1-N_r$, $m=1-N_r$ behave at $T\to 0$ as:

$$D_{2i}(\vec{x}_k,\vec{x}_m,T)-\langle n^{2i}(\vec{x}_k,t)\rangle-g_{km,2i}n^{2i}(\vec{x}_m)\rangle=q_{km,2i}+a_{km,2i}T+b_{km,2i}T^2+ \quad \text{Equation 9}$$

for the even order $\rho=2i$, and $$D_{2i+1}(\vec{x}_k,\vec{x}_m,T)=q_{km,2i+1}+a_{km,2i+1}T+b_{km,2i+1}T^2+ \quad \text{Equation 10}$$

for the odd order $\rho=2i+1$, i=1, 2, 3, . . . Here $$q_{km,2i}=D_{2i}(\vec{x}_k,\vec{x}_m,0)-\langle n^{2i}(\vec{x}_k,t)\rangle-g_{km,2i}\langle n^{2i}(\vec{x}_m,)\rangle \quad \text{Equation 11}$$

and $$q_{km,2i+1}=D_{2i+1}(\vec{x}_k,\vec{x}_m,0) \quad \text{Equation 12}$$

for the even and odd order structure functions, respectively.

The parameters $q_{km,p}$, $a_{km,p}$, $b_{km,p}$, and similar coefficients at $T^3$, $T^4$, . . . , if one chooses to define them, should be estimated in the limit of $T\to 0$ for each calculated pair k and m. The parameters $q_{km,p}$, $a_{km,p}$, and $b_{km,p}$, as well as coefficients at $T^3$, $T^4$, . . . , and the moments $\langle[\partial S(\vec{x}_k,t)/\partial t]^\rho\rangle$ (see Equations 2 and 4) define a diverse body of characteristics of scatterers. As an example, measurements of several characteristics are considered below. To simplify a description, all equations below are presented in terms of components of vectors rather than in terms of vectors.

Location of the receivers is defined as $\vec{x}_k = (x_k, y_k, z_k)$, the mean speed components of scatterers are denoted as $U_x$, $U_y$, $U_z$, and so on.

Indicators for identification of scatterers can be estimated by using the terms $q_{km,p}$ in decomposition of the cross-structure functions, Equations 9–12. To identify the scatterers, namely their shape, spatial distribution within the illuminated volume, material, and so on, one should solve a set of equations at $k=1-N_r$, $m=1-N_r$ for each predetermined order $\rho$. In particular, for $\rho p=2, 3$, and 4 these equations are the follows:

$$q_{km,2} = <d_{x,k}^2>\Delta x_{mk}^2 + <d_{y,k}^2>\Delta y_{mk}^2 + <d_{z,k}^2>\Delta z_{mk}^2 + 2(<d_{x,k}d_{y,k}>\Delta x_{mk}\Delta y_{mk} + <d_{x,k}d_{z,k}>22\ \Delta x_{mk}\Delta z_{mk} + <d_{y,k}d_{z,k}>\Delta y_{mk}\Delta z_{mk})$$ 
Equation 13

$$q_{km,3} = <d_{x,k}^3>\Delta x_{mk}^3 + <d_{y,k}^3>\Delta y_{mk}^3 + <d_{z,k}^3>\Delta z_{mk}^3$$

$$+ 3(<d_{x,k}^2 d_{y,k}>\Delta x_{mk}^2 \Delta y_{mk} + <d_{x,k}^2 d_{z,k}>\Delta x_{mk}\Delta z_{mk} + <d_{x,k}d_{y,k}^2>\Delta x_{mk}\Delta y_{mk}^2) +$$

$$3(<d_{x,k}^2 d_{z,k}>\Delta x_{mk}\Delta z_{mk}^2 + <d_{y,k}^2 d_{z,k}>\Delta y_{mk}^2\Delta z_{mk} + <d_{y,k}d_{z,k}^2>\Delta y_{mk}\Delta z_{mk}^2) +$$

$$6<d_{x,k}d_{y,k}d_{z,k}>\Delta x_{mk}\Delta y_{mk}\Delta z_{mk}$$
Equation 14

$$q_{km,4} = <d_{x,k}^4>\Delta x_{mk}^4 + <d_{y,k}^4>\Delta y_{mk}^4 + <d_{z,k}^4>\Delta z_{mk}^4$$

$$+ 4(<d_{x,k}^3 d_{y,k}>\Delta x_{mk}^3\Delta y_{mk} + <d_{x,k}^3 d_{z,k}>\Delta x_{mk}\Delta z_{mk} + <d_{x,k}d_{y,k}^3>\Delta x_{mk}\Delta y_{mk}^3) +$$

$$4(<d_{x,k}d_{z,k}^3>\Delta x_{mk}\Delta z_{mk}^3 + <d_{y,k}^3 d_{z,k}>\Delta y_{mk}^3\Delta z_{mk} + <d_{y,k}d_{z,k}^3>\Delta y_{mk}\Delta z_{mk}^3) +$$

$$6(<d_{x,k}^2 d_{y,k}^2>\Delta x_{mk}^2\Delta z_{mk}^2 + <d_{x,k}^2 d_{z,k}^2>\Delta x_{mk}^2\Delta z_{mk}^2 + <d_{y,k}^2 d_{z,k}^2>\Delta y_{mk}^2\Delta z_{mk}^2) +$$

$$12 <d_{x,k}^2 d_{y,k}d_{z,k}>x_{mk}^2\Delta y_{mk}\Delta z_{mk} +$$

$$12 <d_x d_{y,k}^2 d_{z,k}>\Delta x_{mk}\Delta y_{mk}^2\Delta z_{mk} +$$

$$12 <d_x d_{y,k}d_{z,k}d_{z,k}^2>\Delta x_{mk}y_{mk}\Delta z_{mk}^2$$
Equation 15

Hereafter $$d_{x,k} = \frac{\partial S(\vec{x}_k, t)}{\partial x}, \quad d_{y,k} = \frac{\partial S(\vec{x}_k, t)}{\partial y}, \quad d_{z,k} = \frac{\partial S(\vec{x}_k, t)}{\partial z},$$
Equation 16 and $$\Delta x_{mk} = f_{mk}(x_m - x_k), \Delta y_{mk} = f_{mk}(y_m - y_k), \Delta z_{mk} = f_{mk}(z_m - z_k)$$
Equation 17 are the effective distances between the receivers. The distance factors $f_{mk}$ are defined below.

The unknown variables in the above equations are the moments of spatial derivatives $d_{x,k}$, $d_{y,k}$, $d_{z,k}$ of the pure signal $S(\vec{x}_k, t)$ from scatterers. One can estimate six second-order moments at $\rho=2$, ten third-order moments at $\rho=3$, fifteen fourth-order moments at $\rho=4$, and so on. Using all (up to $N_{eq}$) calculated values of $q_{km,p}$ for each predetermined order $\rho$, one should obtain estimates for all of those moments that are possible to be estimated. Equations 13–15 as well as similar equations at $\rho>4$ are linear with respect to unknown moments of derivatives if the distance factor does not depend on $q_{km,p}$ and may be non-linear otherwise. The spatial derivatives $d_{x,k}$, $d_{y,k}$, $d_{z,k}$ characterize a rate of change of the pure signal from scatterers $S(\vec{x}_k, t)$ with the receiver center of view being moved from a location $\vec{x}_k$ in x, y, and z direction, respectively. Different moments of these derivatives as well as numerous combinations of the moments provide a broad set of indicators for identification of scatterers. A specific choice of indicators depends on a goal of the identification, analyzed media, type of remote sensor, and many other parameters.

Depending on the predetermined type and required accuracy of identification, the moments of different order should be estimated. For example, one can estimate only second-order moments, second and fourth order moments, third and fifth order moments, and so on. Note, however, that a configuration of a remote sensor can be inadequate for estimation of all moments of a specified order. There are six second-order, ten third-order, and fifteen fourth-order moments of the spatial derivatives. Having (6+10+15) primitive indicators, one can construct a lot of indicators for identification of almost any predetermined characteristic of scatterers. If the above described primitive indicators are still insufficient for identification of a required characteristic of scatterers, one can also define the spatial moments of higher order by using structure functions at $\rho>4$.

It is noteworthy that for remote sensors with several, say four or more antennas one can obtain several estimates for each (or at least some of) the moments. Theoretically all these estimates should be the same, e.g.:

$$<d_{x,k}^2> = <d_{x,m}^2> = <d_x^2>, <d_{y,k}d_{z,k}> = <d_{y,m}d_{z,m}> = <d_y d_z>,$$ Equation 18 and so on. For this reason, the second subscript (the receiver identifier) is omitted below. In practical measurements, however, different estimates for the moments can differ one from another. One can either consider all estimates separately, e.g., $<d_{x,k}^2>$, $<d_{x,m}^2>$, etc. and interpret them as separate indicators, or use any statistic, e.g., the mean value of several estimates as $<d_x^2>$.

The mean speed of scatterers can be estimated by using the terms $a_{km,p}$ in decomposition of the cross-structure functions, Equations 9–10. To estimate components of the mean speed of scatterers, one should solve a set of linear equations at $k=1-N_r$, $m=1-N_r$ for each predetermined order $\rho$. In particular, for $\rho=2$ these equations are the follows:

$$-a_{km,2}/2 = (<d_x^2>\Delta x_{mk} + <d_x d_y>\Delta y_{mk} + <d_x d_z>\Delta z_{mk})U_x$$

$$+ (<d_x d_y>\Delta x_{mk} + <d_y^2>\Delta y_{mk} + <d_y d_z>\Delta z_{mk})U_y$$

$$+ (<d_x d_z>\Delta x_{mk} + <d_y d_z>\Delta y_{mk} + <d_z^2>\Delta z_{mk})U_z$$
Equation 19

Similar equations at $\rho>2$ are too long, and they are not presented here. The only unknown variables in Equation 19 as well as in similar equations at $\rho>2$ are the mean speed components $U_x$, $U_y$, and $U_z$. Using all (up to $N_{eq}$) calculated values of $a_{km,p}$ and all available estimates for the moments of derivatives of the appropriate order, one should obtain all estimates for the mean speed components that are possible to be determined.

For a statistically isotropic field of echoes, Equation 19 and similar equations at $\rho>2$ can be simplified. In this case:

$$<d_x d_y> = <d_x d_z> = <d_y d_z> = 0, \text{ and } <d_x^2> = <d_y^2> = <d_z^2> = <d_r^2>,$$
Equation 20 where r denotes any direction; all directions are equivalent for an isotropic field. Taking into account isotropic relations (Equation 20) at $\rho=2$ and similar relations at $\rho>2$, one can derive simplified equations for the mean speed components of scatterers. For example, at $\rho=2$ and 4 these equations are:

$$-a_{km,2}/2 = <d_r^2>\Delta x_{mk}U_x + <d_r^2>\Delta y_{mk}U_y + <d_r^2>\Delta z_{mk}U_z$$  Equation 21

$$-a_{km,4}/4 = <d_r^4>(\Delta x_{mk}^3 + \Delta x_{mk}\Delta y_{mk}^2 + \Delta x_{mk}\Delta z_{mk}^2)U_x$$  Equation 22

$$<d_r^4>(\Delta y_{mk}^3 + \Delta y_{mk}\Delta x_{mk}^2 + \Delta y_{mk}\Delta z_{mk}^2)U_y$$

$$<d_r^4>(\Delta z_{mk}^3 + \Delta z_{mk}\Delta x_{mk}^2 + \Delta z_{mk}\Delta y_{mk}^2)U_z$$

However, the isotropic equations should be used with a caution. In spite of a wide use of the assumption on a statistically isotropic field of echoes in remote sensing, this is more exception than a rule. The use of simplified, isotropic equations can cause significant errors in the measured mean speed of scatterers, hence, these equations are not recommended to be used unless there are serious reasons for doing so.

The turbulence characteristics can be estimated by using the terms $b_{km,p}$ in decomposition of the cross-structure functions, Equations 9–10, and the terms $<d_{t,k}>$ in decomposition of the auto-structure functions, Equations 2–3. It is important to understand a difference between estimating indicators for identification of scatterers and the mean speed of scatterers from estimating the turbulence characteristics. The equations noted above are asymptotically exact. There is no exact relation between the parameters $b_{km,p}$ and/or $<d_{t,k}^2>$ and turbulence characteristics. To relate any turbulence characteristic to parameters of structure functions, one should adopt several assumptions about statistics of turbulent field, characteristics of scatterers, parameters of remote sensor, etc. For this reason, any relation is inevitably empirical and all the conditions of its validity cannot be fully specified.

For example, the following relations between the root-mean-square (RMS) intensity of isotropic turbulence $\sigma_{turb}$ and parameters $b_{km,2}$ and $<d_{t,k}^2>$ can be derived:

$$\sigma_{turb} = \frac{\lambda}{4\pi}\sqrt{\frac{\langle d_{t,k}^2 \rangle}{\langle S^2(\vec{x}_k, t)\rangle} - 4\left(\frac{\langle d_{x,k}^2\rangle}{\langle S^2(\vec{x}_k, t)\rangle}U_x^2 + \frac{\langle d_{y,k}^2\rangle}{\langle S^2(\vec{x}_k, t)\rangle}U_y^2\right)}$$  Equation 23

$$\sigma_{turb} = \frac{\lambda}{4\pi}\sqrt{\frac{\langle b_{km,2}\rangle}{\langle S^2(\vec{x}_k, t)\rangle} - 4\left(\frac{\langle d_{x,k}^2\rangle}{\langle S^2(\vec{x}_k, t)\rangle}U_x^2 + \frac{\langle d_{y,k}^2\rangle}{\langle S^2(\vec{x}_k, t)\rangle}U_y^2\right)}$$  Equation 24 where $\lambda$ is the radar wavelength.

These relations provide numerous estimates for the turbulence intensity $\sigma_{turb}$. Theoretically $b_{km,2}$ and $<d_{t,k}^2>$ are the same values for all pairs $k=1-N_r$ and $m=1-N_r$ at $|\vec{x}_k - \vec{x}_m| \to 0$, hence, all estimates for turb should be the same although in practical measurements they can differ significantly one from another. One can consider some statistics of these estimates, e.g., their mean value, or median as a measure of turbulence intensity; one can consider a scatter between the estimates as an additional turbulence characteristic, or one can use any combination of these two approaches.

Equations 23 and 24 are not unique. Adopting another set of assumptions, one can derive another relations between parameters of measured structure functions and different turbulence characteristics, and not necessary the turbulence intensity. There is another approach to measurements of turbulence characteristics by using spaced receiver remote sensors. If one can obtain the mean wind speed components $U_x(t)$, $U_y(t)$, and $U_z(t)$ at relatively small time of averaging $T_{av}$, one can interpret these values as the time series of the instantaneous wind speed components. One can then define proper statistics of these time series to estimate any predetermined characteristic of turbulence. One should, however, realize that the values $U_x(t)$, $U_y(t)$, and $U_z(t)$ are weighted averages over an illuminated volume and over the time of averaging.

Post-Processing of Estimates for the Characteristics of Scatterers

Post-processing of step 105 is applied to provide the most reliable final estimates for the predetermined characteristics of scatterers, and, if this is required, statistical errors for each characteristic as well as a measure for reliability of the estimates. Post-processing can include (although it is not limited by) the following operations.

(a) Statistical analysis of all obtained estimates for the predetermined characteristics of scatterers at the analyzed time interval $[t_0, t_0+T_{av}]$ if the remote sensor allows to produce several estimates for some characteristics. Such an analysis can be accomplished at the appropriate previous stages (during calculation and analysis of the auto- and cross-structure functions) although this is not the most effective way to analyze all obtained information.

(b) Joint statistical analysis of the characteristics of scatterers at the analyzed time interval with those from the previous interval(s) if one chooses to apply this option. Such an analysis can be accomplished by using all estimates for each predetermined characteristic of scatterers, statistics of estimates from the previous procedure (a), or any combination of the both.

(c) Joint statistical analysis of the characteristics of scatterers at the analyzed range with those from other close enough ranges if one chooses to apply this option. Such an analysis can be accomplished by using all estimates for each predetermined characteristic of scatterers, statistics of estimates from the previous procedure(s) (a) and/or (b), or any combination of the above.

(d) Identification of scatterers in accordance with predetermined requirements by using a set of measured indicators if the identification is required. Such an identification can be accomplished by using all estimates for each predetermined indicator, statistics of estimates from the previous procedure(s) (a) and/or (b) and/or (c), or any combination of the above.

User Display and/or Data Archiving

The final estimates for the predetermined characteristics of scatterers can be displayed in any user specified format at step 106. This may be the range-time arrows or bars, the range-time color-coded plots, time series of selected characteristics for selected ranges, and so on. The data can also be archived for future use and/or reference. One can archive all estimates for each predetermined characteristic, the final results of the post-processing, or any combination of the above. Archiving can be accomplished in any user-specified data format and into any type of data storage (the computer hard disc, CD-ROM, tape, etc.)

Conditions for the Method to be Effectively Used

For the present method to be effectively used, the remote sensor should satisfy certain conditions. There are two sets of such conditions. The first one includes the necessary limitations. If any one of these limitations is not satisfied, the method cannot be used at all. The second set includes the preferred requirements. If any one of these requirements is not satisfied, the method can still be used although it will lose some of its advantages. An amount of information that can be practically obtained by applying the present method depends on the number and location of receivers at the remote sensor. To clarify further description, one should first define the term "receiver".

Figure 3A:
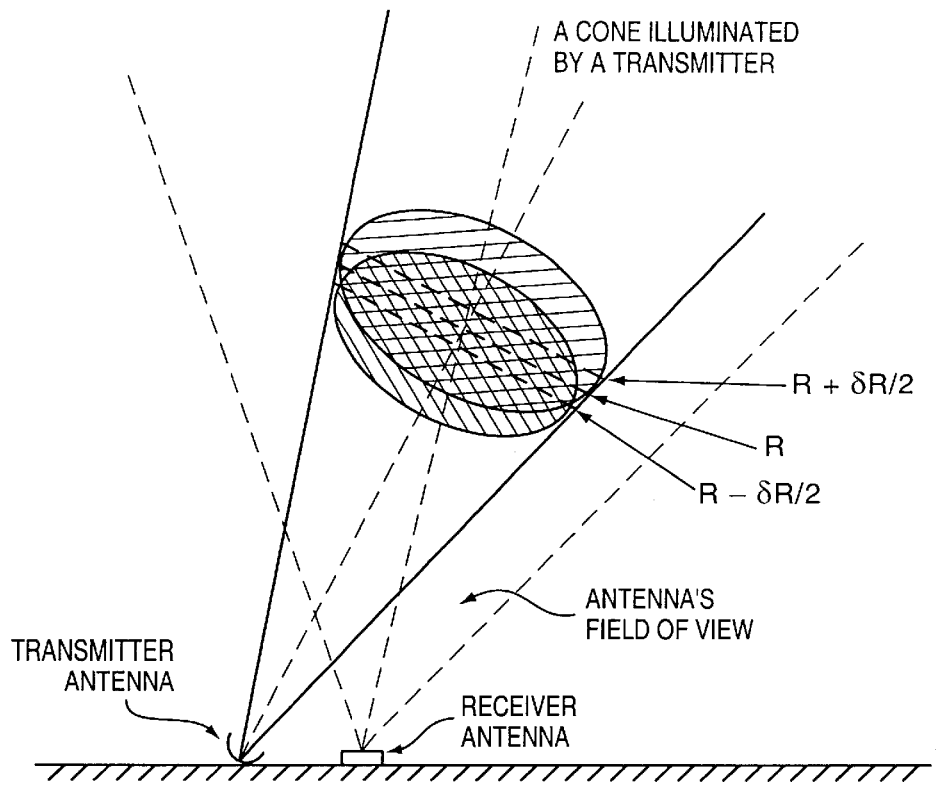
FIGS. 3A, 3B illustrate antenna patterns for obtaining two return signals (two receivers) with one antenna.
Figure 3B:
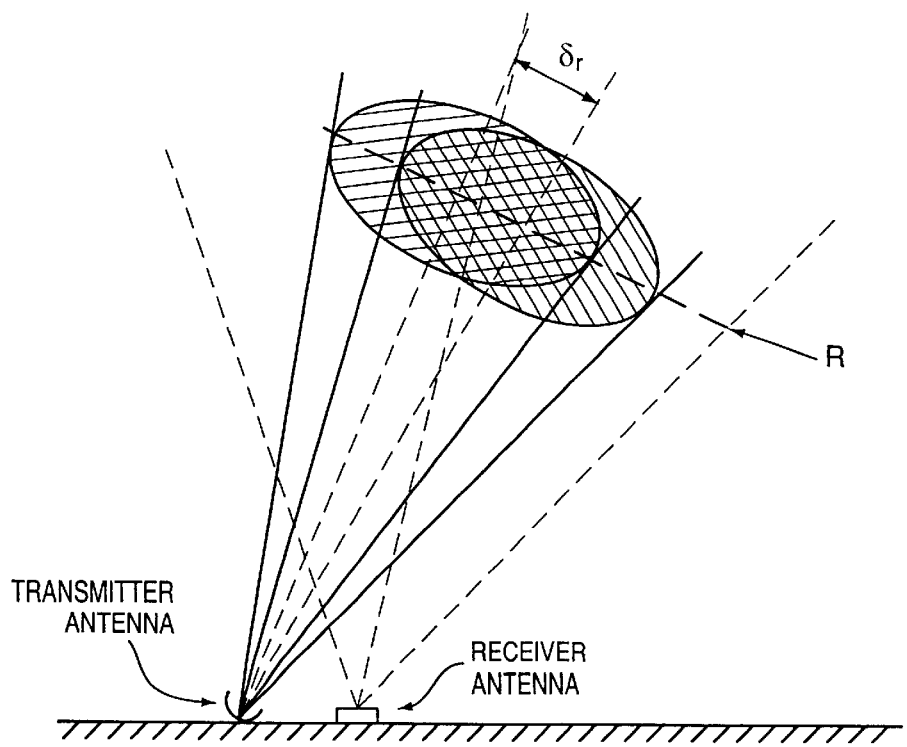

Definition of a "receiver". A new theory behind the method relates characteristics of scatterers in the illuminated volume to parameters of the auto- and cross-structure functions of signals from receivers with centers of view in different although very close locations. The contents of the term "receiver" is just a return signal independently on a practical way for obtaining this signal. There are two alternative ways for obtaining signals from two locations that are separated in along the beam direction. First, one can use two antennas that are spatially separated in along the beam direction, and are both focused at the same range. Second, one can use one antenna, and obtain two signals at slightly separated while strongly overlapping ranges (oversampling along the beam). This case is illustrated in FIG. 3A where δR denotes separation between receivers along the beam, and shading shows fields of view for two receivers from one antenna. Similarly, there are two ways to obtain signals from two locations that are separated in a plane normal to the transmitted beam. First, one can use two spatially separated antennas. Second, one can use swinging beam to produce several signals from slightly separated while strongly overlapping fields of view. This case is illustrated in FIG. 3B where δr denotes separation between two receivers in any normal to the beam direction r, and shading shows fields of view for two receivers from one antenna. Note that swinging must be very fast to satisfy the necessary limitation on the sampling time interval (see below). For applying the method, all the above alternatives for obtaining spatially separated receivers are fully equivalent.

The Necessary Limitations to be Satisfied (a) The remote sensor must have at least two spatially separated receivers.

(b) The receiver fields of view must overlap one another. More rigorously, the correlation coefficient between return signals for any pair of receivers:

$$\rho(\vec{x}_k, \vec{x}_m) = \frac{\langle s(\vec{x}_k, t)s(\vec{x}_m, t)\rangle}{\sqrt{\langle s^2(\vec{x}_k, t)\rangle \langle s^2(\vec{x}_m, t)\rangle}} \qquad \text{Equation 25}$$

must satisfy the condition:

$$0 < \rho(\vec{x}_k, \vec{x}_m) < 1 \qquad \text{Equation 26}$$

(c) A theory behind the method is exact just asymptotically at T→0. It can be applied in practice to the auto-structure functions $D_\rho(\vec{x}_k, T)$ and cross-structure functions $D_\rho(\vec{x}_k, \vec{x}_m, T)$ only at very small separations $T \leq T_{max}^{theor}$. Theoretical limit for the time separation is:

$$T_{max}^{theor} \approx \frac{\delta_{min}}{2|V|_{max}} \qquad \text{Equation 27}$$

Here $\delta_{min}$ min is the minimal distance between centers of receivers in any (x, y, or z direction), and $|V|_{max}$ is the maximum expected absolute value of the mean speed of scatterers over the analyzed time interval $[t_0, t_0+T_{av}]$ at the analyzed range R. Because return signals are discrete time series, one can calculate the structure functions only at discrete separations T=Δt, 2Δt, 3Δt, and so on. To estimate the moments of noise, one must calculate the auto-structure functions at not less than two separations which gives $\Delta t \leq T_{max}^{theor}/2$. Hence, the sampling time interval Δt must satisfy the condition:

$$\Delta t \leq \frac{\delta_{min}}{4|V|_{max}} \qquad \text{Equation 28}$$

The Preferred Requirements to be Satisfied

As was noted above, an amount of information that can be practically obtained by applying the present method depends on the number and location of receivers, i.e., on a configuration of the remote sensor.

(a) A remote sensor with the optimal configuration should have at least eight noncoplanary located receivers. The method provides numerous characteristics of scatterers (e.g., unambiguous indicators for identification of scatterers, all three mean speed components, turbulence characteristics as well as statistical errors and a measure of reliability for the estimates) for such a configuration until all the above listed necessary limitations are satisfied. For such configuration, the method is redundant to a failure of some of antennas if Spaced Antenna remote sensor is used.

(b) A remote sensor with a sufficient configuration should have at least four noncoplanary located receivers. The method provides many characteristics of scatterers (e.g., several indicators for identification of scatterers, all three mean speed components, turbulence characteristics) for such a configuration until all the above listed necessary limitations are satisfied. However, such configuration does not provide a redundance for a failure of any one antenna if Spaced Antenna remote sensor is used.

(c) A remote sensor with three or more receivers that are all located in a plane normal to the beam (e.g., the NCAR's MAPR without oversampling along the beam) can provide a truncated set of indicators for identification of scatterers, only $U_x$ and $U_y$ mean speed components, and turbulence characteristics with the present method. The along-the-beam mean speed component $U_z$ can be obtained from the Doppler spectra.

(d) If a two-receiver remote sensor is used, the method can provide only the projection of the mean speed on the vector from one receiver to another and some turbulence characteristics.

(e) The above listed necessary limitations (b) and (c) define the necessary condition for the method to be used. The optimal requirements are stronger, and they are the following.

For the sampling time interval:

$$\Delta t \leq \frac{\delta_{min}}{8|V|_{max}} \qquad \text{Equation 29}$$

For the separation between receivers in a normal to the beam plane:

$$0.50 \leq \rho(\vec{x}_k, \vec{x}_m) \leq 0.95 \qquad \text{Equation 30}$$

For separation between receivers along the beam:

$$0.80 < \rho(\vec{x}_k, \vec{x}_m) \leq 0.95 \qquad \text{Equation 31}$$

Additional Remarks

The mean speed and turbulence of a media. In the theory, the resulting mean speed components and turbulence characteristics are the appropriate parameters of the motion of scatterers in the illuminated volume. In practical measurements, the observer is typically (although not always) interesting in characteristics of motion of a media, e.g., the wind speed and turbulence in atmospheric measurements. To relate the mean speed and turbulence of scatterers to that of a media, one should make the following assumption: Components of the mean advection speed and turbulence characteristics of scatterers are approximately equal to the respective characteristics of motion of a media. This assumption is usually taken for granted in remote sensing. However, it is not obviously valid in all cases. Physically, this assumption means that scatterers are the "ideal tracers" for the motion of a media. This is valid when scatterers are small enough to be fully advected by a media (i.e., their inertia should be negligibly small) while large enough to be undisturbed by any local random perturbations (e.g., by the Brounian motion in gases). Finally, the above statement is just an assumption, and it should be applied with a proper caution.

Atmospheric Example of the System

This section describes an application of the present method for identification of scatterers and measurements of the mean wind speed and turbulence intensity in the atmosphere by SR radar. The mean wind speed and turbulence are defined as those of scatterers, i.e., the assumption from above is adopted.

A radar with the preferred configuration does not exist yet. Simulated return signals with fully controlled parameters are used to illustrate an application of the method. The standard simulation technique is used to generate the return signals.

Configuration of the SA Radar

Figure 4A:
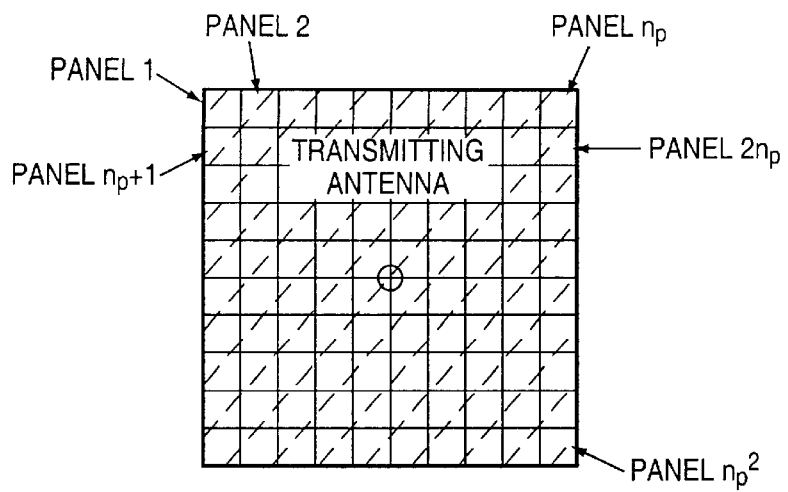
FIGS. 4A–4E illustrate typical configurations of multi-panel-antenna radars for use in the present system for measuring characteristics of scatterers using spaced receiver remote sensors, with schematics for transmitting and receiving antennas implemented therein.
Figure 4B:
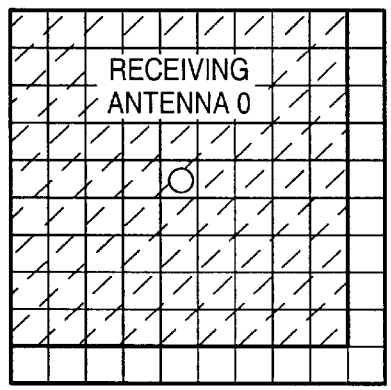
Figure 4C:
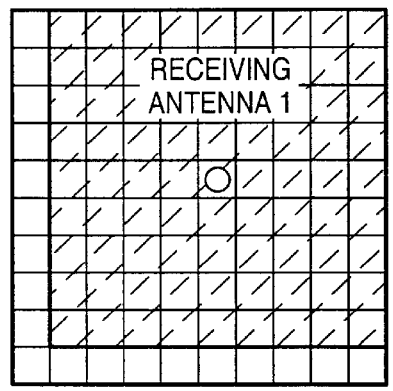
Figure 4D:
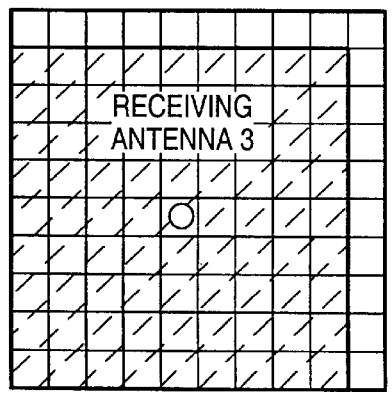
Figure 4E:
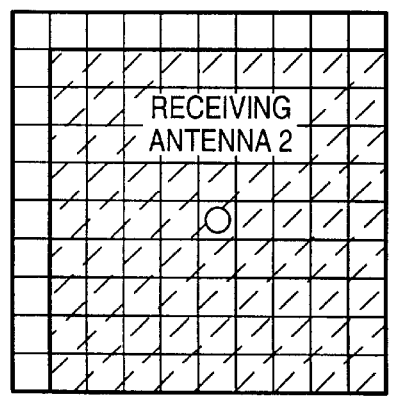
Figure 5:
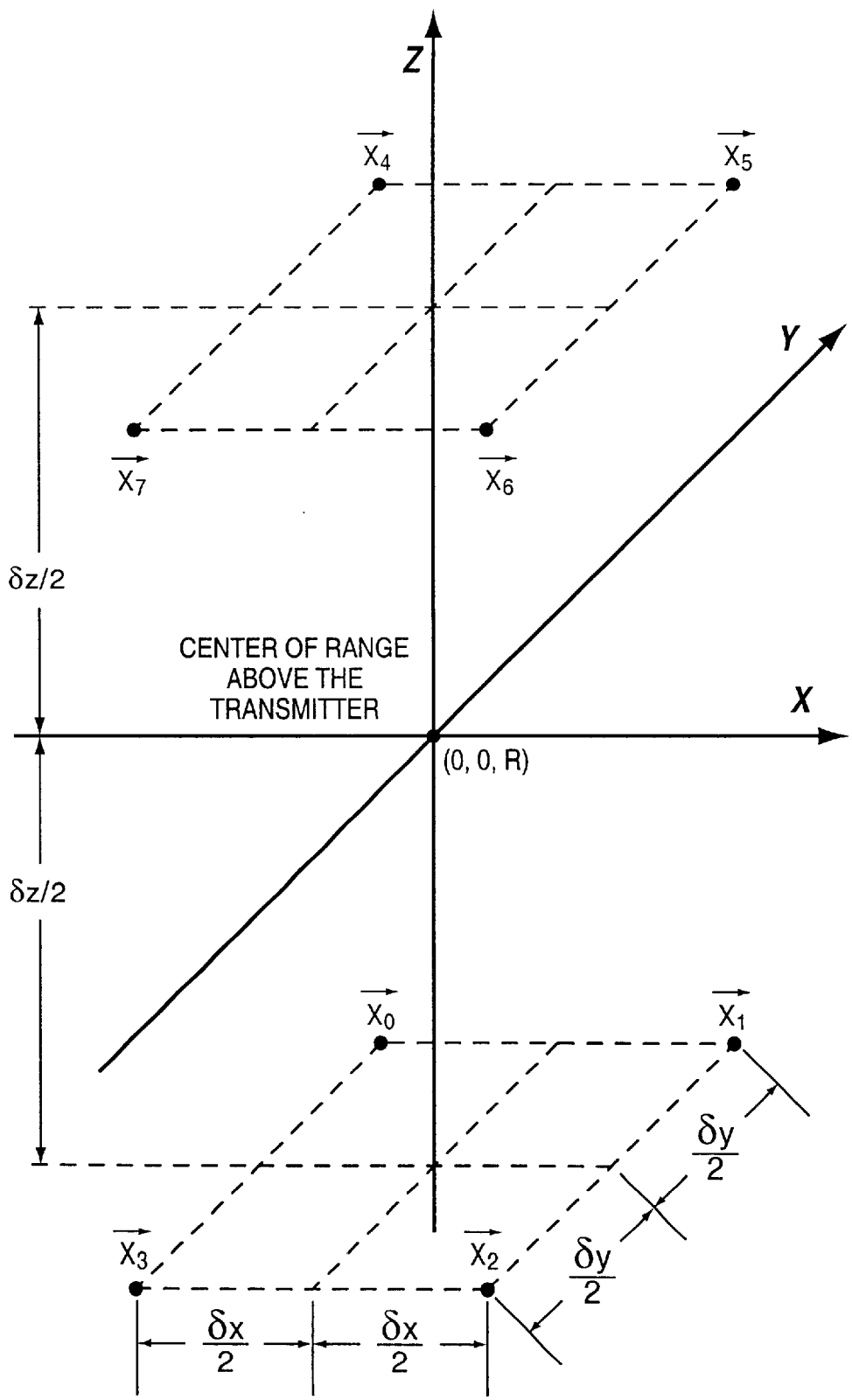
FIG. 5 illustrates in graphical form the relative spatial location of the centers of view for eight receivers for the present system for measuring characteristics of scatterers using spaced receiver remote sensors.
Figure 6A:
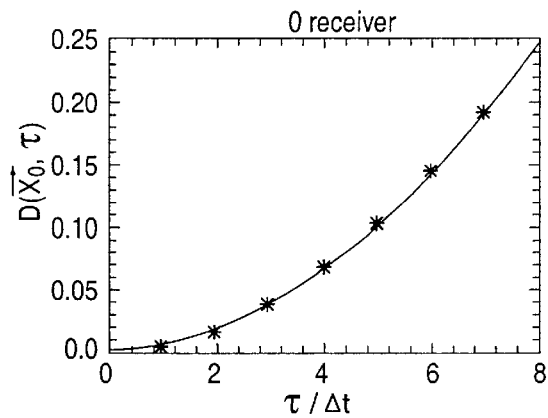
FIGS. 6A–6D illustrate, in graphical form, examples of the auto-structure functions for four receivers, and the best-fit approximation to these functions at the limit of T→0.
Figure 6B:
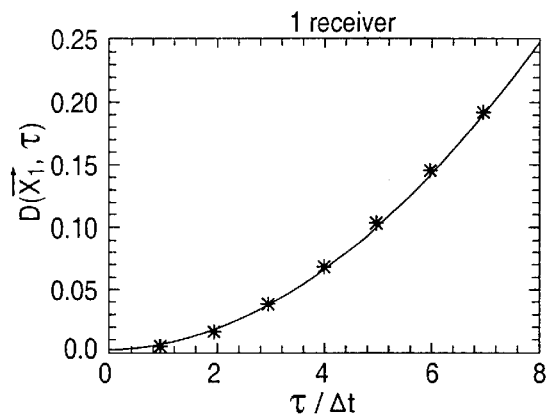
Figure 6C:
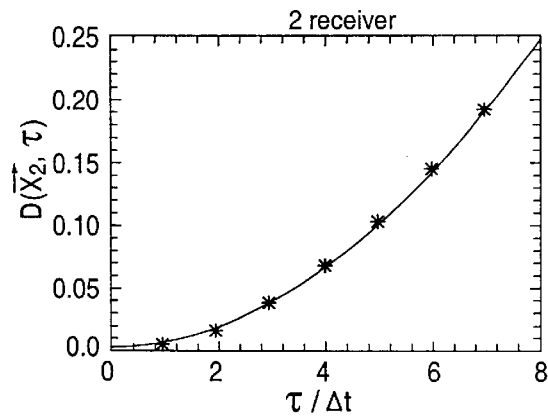
Figure 6D:
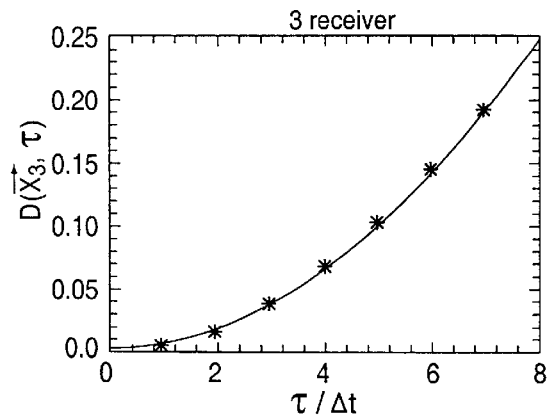
Figure 7A:
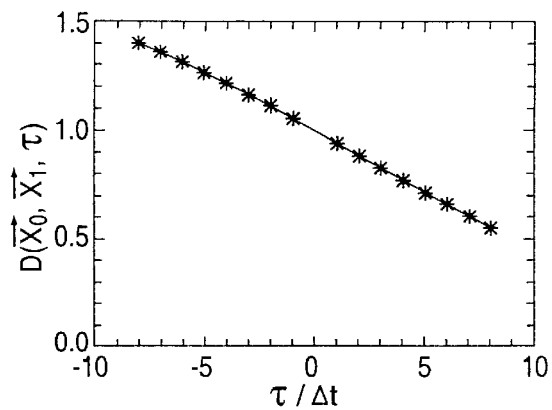
FIGS. 7A–7F illustrate, in graphical form, examples of the second order cross-structure functions for four selected receivers, and the best-fit approximation to these functions at the limit of TΔ0.
Figure 7B:
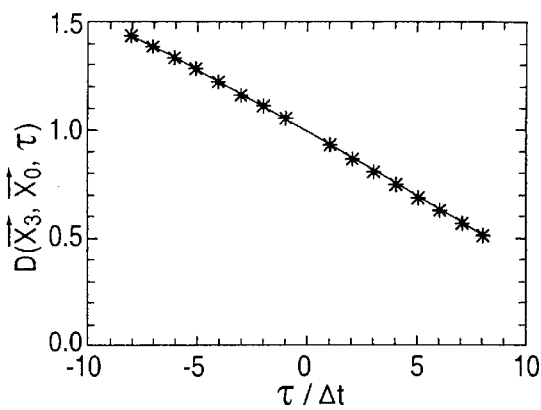
Figure 7C:
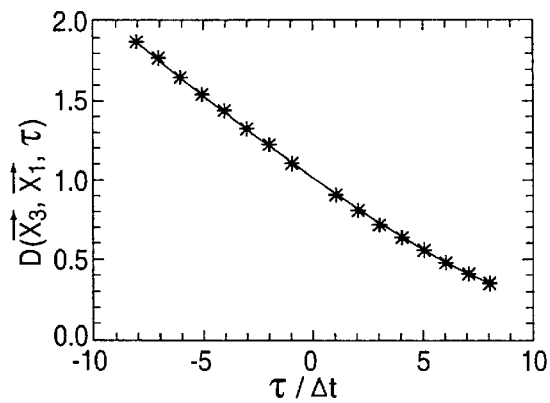
Figure 7D:
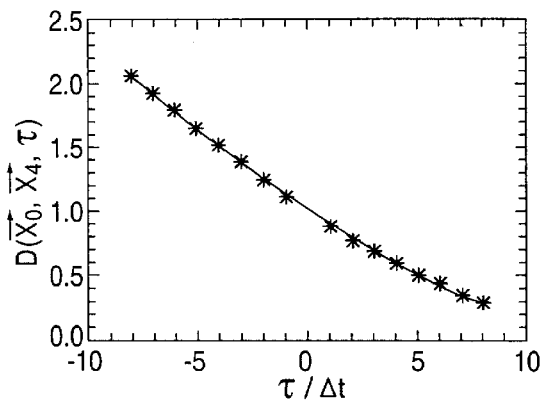
Figure 7E:
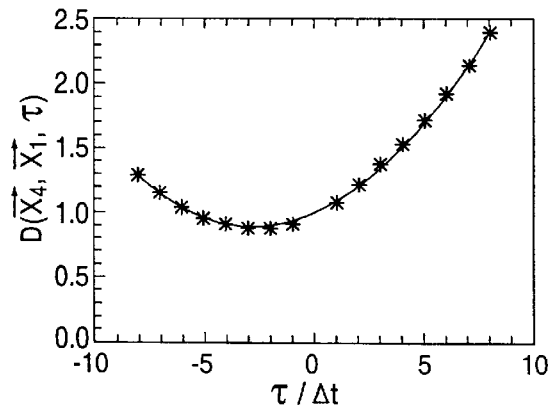
Figure 7F:
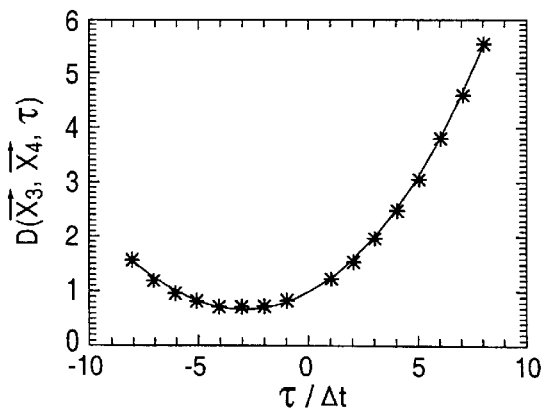

The pulse-wave radar with a square-shaped $n_\rho^2$-panel antenna is considered, and all $n_\rho^2$ panels are used as a transmitter (FIG. 4A). Four square-shaped overlapping receiving antennas are combined from $(n_\rho-1)^2$ panels each, and each one is processed through independent receiving channel. The center of each receiving antenna is indicated by a circle in FIGS. 4B–4E. Each receiving antenna provides return signals for two overlapping ranges R−δR/2 and R+δR/2 for each specified range R (see FIG. 3A for an illustration), and that converts each receiving antenna into two receivers. For a specified range, this configuration provides a relative spatial location for the center of view for eight receivers that is shown in FIG. 5. In this figure $\delta_x$, $\delta_y$, and $\delta_z$ denote separation between centers of receiver fields of view in x, y, and z directions, respectively.

Parameters of Simulation

Several simulations are used to explain and illustrate the present method. Parameters of each simulation are somewhat arbitrary although they are fully realistic. The range weighting function is assumed Gaussian. The transmitter gain function and the antenna field of view gain functions are assumed Gaussian as well. Parameters of the simulated radar are the following: the wavelength λ=0.328 m; the range resolution ΔR=60 m; the standard deviation for the radar range weighting function $\delta_R$=15 m; the transmitter size $D_T$=2 m; the transmitter beam half-width $\theta_T$=4.5 degrees; the total number of panels $n_\rho^2=10^2$; the number of panels in each receiving antenna $(n_\rho-1)^2=9^2$; the receiving antenna size $D_R$=1.8 m; the receiver field of view half-width $\theta_R$=5.0 degrees; the separation between receiving antennas in x and y directions $\delta_x=\delta_y$=0.2 m; the separation between receiving antennas in z direction $\delta_l=\delta_z$=6 m; the center range R=300 m; the sampling time interval Δt=0.001 s.

In simulation A, a fixed, vertically looking operational mode was considered, i.e., the simulated radar operated as a wind profiler. Scatterers were considered as spherical small particles with randomly prescribed relative reflectivity between 0.5 and 1 which reproduced Bragg scattering from the air scatterers. The total of 6500 scatterers were randomly distributed within the illuminated volume at the initial time instant t=0, and then moved at every time step Δt in accordance with the local instantaneous velocity. The latter value is a sum of imposed non-stationary mean wind vector, and spatially correlated, temporally and spatially random turbulent wind field. The mean wind vector was given by the relations:

$$U_x(t) = 20 - 30\frac{t}{T},\ U_y(t) = 15 - 15\ \sin\!\left(\frac{\pi}{2}\frac{t}{T}\right), \qquad \text{Equation 32}$$

$$Uz(t) = 20 - 30\frac{t}{T}$$

where the wind speed components are given in m/s, and T=368.64 s is a total time of simulation. The x, y, and z RMS components of turbulent velocities were $\sigma_x$=0.5 m/s, $\sigma_y$=0.4 m/s, $\sigma_z$=0.3 m/s, respectively; and the turbulence integral length scale was L=50 m. This simulation was used to illustrate measurements of characteristics of motion of scatterers (the mean speed components and turbulence intensity) with the present method.

In simulations B–D, a fixed, horizontally looking operational mode was considered to reproduce the optimal operational regime for a dual-polarization radar. These simulations were used to illustrate identification of scatterers with the present method. The isotropic air scatterers with random reflectivity from 0.5 to 1, rain droplets (water pancakes), and ice needles were considered as scatterers in the simulations B, C, and D, respectively. Water pancakes were of a spheroid shape with a size of 2 mm in horizontal directions, and 0.2 mm in vertical direction at a temperature 15 degrees C. The ice needles were also of a spheroid shape with a size of 0.2 mm in horizontal directions, and 2 mm in vertical direction at a temperature −10 degrees C. The total of 1600 scatterers were used in these simulations, and no turbulence were imposed. The mean wind speed components in the simulations B–D were the same as in A given by Equation 32.

Simulations A–D were processed in the same way. After a return signal in the standard complex form {I(t),Q(t)} was simulated for each of 8 receivers, a random noise with zero correlation lag and/or clutter with specified time correlation lag were added to it. The sum of a "pure" atmospheric return and its contaminating component(s) was then processed by the present method to identify the scatterers and retrieve the imposed mean wind speed components and turbulence intensity.

Measurements of the Characteristics of Scatterers with the Present Method

A random noise with zero time correlation lag was added to simulated "pure" atmospheric returns from each receiver.

Noise was added independently to the in-phase and quadrature components in such a way that signal-to-noise ratio (SNR) was 3 dB for both $I(k,t)$ and $Q(\vec{x}_k,t)$ for all $k=0-7$. The time average interval was chosen as $T_{av}=20.48$ s, and the update rate was chosen as $T_{ur}=T_{av}$. This means that characteristics of scatterers were estimated over non-intersecting segments of time series. The values for $T_{amax}$ and $T_{cmax}$ were chosen as $8\Delta t$ and $8\Delta t$, respectively. The auto- and cross-structure functions of the second, third, and fourth order (i.e., at $\rho=2-4$) were calculated and analyzed.

Pre-processing of Return Signals

The standard complex return signals from each of eight receivers were first passed through a low-pass filter to increase the signal-to-noise-ratio. The filter cut-off frequency was 150 Hz which is larger than the maximum expected Doppler frequency $$f_{Doppler}=2|U_z|_{max}/\lambda \approx 122 \text{ Hz}.$$

The raw signal power was then calculated for each receiver as:

$$\hat{s}(\vec{x}_k,t)=[I(\vec{x}_k,t)-\langle I(\vec{x}_k,t)\rangle]^2+[Q(\vec{x}_k,t)-\langle Q(\vec{x}_k,t)\rangle]^2, k=1-7 \quad \text{Equation 33}$$

The mean value from raw power was removed, and the power was normalized with its standard deviation for each receiver as:

$$s(\vec{x}_k,t)=\frac{\hat{s}(\vec{x}_k,t)-\langle \hat{s}(\vec{x}_k,t)\rangle}{\sqrt{\langle[\hat{s}(\vec{x}_k,t)-\langle \hat{s}(\vec{x}_k,t)\rangle]^2\rangle}}, \quad k=1-7 \quad \text{Equation 34}$$

Calculation and Analysis of Auto-structure Functions

The auto-structure functions were calculated in accordance with their definition, Equation 1, at $\rho=2$, 3, and 4 for each receiver $k=0-7$ at $1 \leq T/\Delta t \leq 8$ over each time interval $[t_0, t_0+T_{av}]$ where $t_0=0$, $T_{av}$, $2T_{av}$, $3T_{av}$, and so on. An example of calculated second-order auto-structure functions for several receivers over the interval $[0, T_{av}]$ for simulation A is presented by asterisks in FIGS. 6A–6D. The auto-structure function $D_\rho(\vec{x}_k,t)$ for each receiver $k=0-7$ at separations $1 \leq T/\Delta T \leq 8$ was approximated by using the standard least-square procedure in accordance with the theoretical Equations 2 and 3 as:

$$D_\rho(\vec{x}_k,T)=c_{k,\rho}^{(0)}+c_{k,\rho}^{(T)}T^\rho, \quad C_{k,3}^{(0)}=0 \quad \text{Equation 35}$$

Examples of the best fit are shown by solid lines in FIG. 6.

Moments of the signal time derivatives were defined for each receiver for a time interval $[t_0, t_0+T_{av}]$ as $\langle d_{t,k}{}^\rho\rangle=c_{k,\rho}^{(T)}$ at $\rho=2$, 4, and $\langle d_{t,k}{}^3\rangle=-c_{k,3}^{(T)}$.

The even-order moments of noise were then defined for each receiver for a time interval $[t_0, t_0+T_{av}]$ as $\langle n^\rho(\vec{x}_k,t)\rangle=c_{k,\rho}^{(0)}/2$ at $\rho=2$, 4.

The relative gains $g_{k0,\rho}$ for receivers $k=1-7$ with respect to the receiver 0 were defined for a time interval $[t_0, t_0+T_{av}]$ at $\rho=2$ and 4 in accordance with Equation 5. The Equation 7 was used to define the gain factors at $\rho=3$. The signal for receiver $\vec{x}_0$ was then kept unchanged while signals for receivers $\vec{x}_1-\vec{x}_7$ were multiplied by the relative gains $g_{k0,\rho}$ before calculating the cross-structure functions of the order $\rho$. After this procedure, the relative gains $g_{km,\rho}=1$ for all $k=0-7$ and $m=0-7$ were used in the further calculations over a time interval $[t_0, t_0+T_{av}]$.

Calculation and Analysis of Cross-structure Functions

The cross-structure functions were calculated in accordance with their definition, Equation 8, for each pair of receivers $k=0-7$, $m=0-7$ at $1 \leq |T/\Delta t| \leq 8$. A total of 28 cross-structure functions were calculated at each $\rho=2$, 3, and 4 over each time interval $[t_0, t_0+T_{av}]$. An example of calculated second-order cross-structure functions for several pairs of receivers over the interval $[0, T_{av}]$ for simulation A is presented by asterisks in FIGS. 7A–7F. The cross-structure function $D_\rho(\vec{x}_k, \vec{x}_m, T)$ at each $\rho=2$, 3, and 4 for each pair $k=0-7$, $m=0-7$ at separations $1 \leq |T/\Delta t| \leq 8$ was approximated by using the standard least-square procedure in accordance with the theoretical Equations 9 and 10 as:

$$D_\rho(\vec{x}_k,\vec{x}_m,T)-\langle n^\rho(\vec{x}_k,t)\rangle-\langle n^\rho(\vec{x}_m,t)\rangle=q_{km,\rho}+a_{km,\rho}T+b_{km,\rho}T^2 \quad \text{Equation 36}$$

at $\rho=2$ and 4, and, at $\rho=3$, as $$D_3(\vec{x}_k,\vec{x}_m,T)=q_{km,3}+a_{km,3}T+b_{km,3}T^2 \quad \text{Equation 37}$$

Examples of the best fit are shown by solid lines in FIG. 7. Parameters $q_{km,\rho}$, $a_{km,\rho}$, $b_{km,\rho}$ were defined at each $\rho=2$, 3 and 4 from the best fit approximations for each pair $k$ and $m$ for each time interval $[t_0, t_0+T_{av}]$.

Primitive indicators for identification of scatterers are the moments of spatial derivatives for return signal. The second–fourth order moments can be estimated by using Equations 13–15. Similar equations can be easily derived for the higher-order moments. There are six second-order moments of the spatial derivatives: $(d_x{}^2)$, $(d_y{}^2)$, $(d_z{}^2)$, $(d_x d_y)$, $(d_x d_z)$, $(d_y d_z)$ and several estimates for each of these moments can be obtained with the preferred configuration remote sensor. To get one estimate for each of these six moments, four noncoplanary located receivers are required. For the radar with the preferred configuration, any four noncoplanary located receivers create a pyramid (see FIG. 5). Theoretically independent estimates can be obtained from pyramids with independent pairs of receivers along each coordinate axis. For the radar with the preferred configuration, one can define only four such pyramids although these four pyramids can be defined in many different ways. The following combination was used in the present calculations: the pyramid 1 from receivers 0, 1, 3, 4; the pyramid 2 from receivers 1, 2, 3, 6; the pyramid 3 from receivers 1, 4, 5, 6; the pyramid 4 from receivers 3, 4, 6, 7. Only one estimation of the moments was obtained for each of the pyramids.

Equations 13–15 are presented in a general form that is applicable to any configuration of a remote sensor. For a specific relative location of receivers, these equations can be analytically simplified. In particular, for the pyramid 1 Equation 13 provides the following set of linear equations for estimation of the second order moments of spatial derivatives:

$$\langle d_x^2\rangle=\frac{q_{01,2}}{\Delta x_{10}^2}, \langle d_y^2\rangle=\frac{q_{30,2}}{\Delta y_{03}^2}, \langle d_z^2\rangle=\frac{q_{04,2}}{\Delta z_{40}^2}, \quad \text{Equation 38}$$

$$\langle d_x d_y\rangle=\frac{q_{31,2}-q_{01,2}-q_{30,2}}{2\Delta x_{10}\Delta y_{03}},$$

-continued $$\langle d_x d_z \rangle = -\frac{q_{41,2} - q_{01,2} - q_{04,2}}{2\Delta x_{10} \Delta z_{40}},$$

$$\langle d_y d_z \rangle = \frac{q_{34,2} - q_{04,2} - q_{30,2}}{2\Delta y_{03} \Delta z_{40}},$$

Similar expressions can be written for other pyramids. These equations were solved to obtain one estimate for the second order moments of spatial derivatives of return signal for each pyramid over each time interval $[t_0, t_0+T_{av}]$, and these estimates were kept separately until the post-processing.

There are ten third-order moments of the spatial derivatives: $(d_x^3)$, $(d_y^3)$, $(d_z^3)$, $(d_x^2 d_y)$ and so on; see Equation 14. Several estimates for each of these moments can be obtained with the preferred configuration remote sensor. To get one estimate for each of these ten moments, five noncoplanary located receivers are required. For the radar with the preferred configuration, four theoretically independent estimates can be obtained for each moment. Contrary to the second-order moments, all estimates for each of the third order moments were combined into one estimate. The following relations were used for some of the combined moments:

$$\langle d_x^3 \rangle = -\frac{q_{01,3} + q_{32,3} + q_{45,3} + q_{76,3}}{4\Delta x^3} \quad \text{Equation 39}$$

$$\langle d_x d_y^2 \rangle = \frac{q_{01,3} + q_{32,3} + q_{45,3} + q_{76,3} - q_{02,3} - q_{46,3} - q_{31,3} - q_{75,3}}{12\Delta x \Delta y^2}$$

$$\langle d_x d_y d_z \rangle = -\frac{q_{35,3} + q_{42,3} - q_{71,3} - q_{06,3}}{24\Delta x \Delta y \Delta z}$$

where $$\Delta x = (f_{10}+f_{23}+f_{54}+f_{67}) \, \delta x,$$

$$\Delta y = (f_{03}+f_{12}+f_{47}+f_{56}) \, \delta y,$$

$$\Delta z = (f_{40}+f_{51}+f_{73}+f_{62}) \, \delta z$$

Similar expressions can be written for other moments. These equations were solved to obtain one estimate for each third order moment of spatial derivatives of return signal over each time interval $[t_0, t_0+T_{av}]$.

There are fifteen fourth-order moments of the spatial derivatives: $(d_x^4)$, $(d_y^4)$, $(d_z^4)$, $(d_x^3 d_y)$, and so on; see Equation 15. Formally, six noncoplanary located receivers are required to get one estimate for all these moments. However, these six receivers should be located in such a way that Equations 15 for these six receivers are linearly independent. It can be accomplished by using three receivers centers of which create irregular triangle, four receivers centers of which create irregular figure, five receivers centers of which create a pentagon, and so on. A radar with the preferred configuration does not satisfy this condition, and only nine of 15 fourth order moments can be defined independently while only three pairs from other 6 moments can be measured. On the other hand, four independent estimates for each of these 12 parameters can be obtained with the preferred configuration radar. Similar to the third-order moments, all estimates for each of the fourth order moments were combined into one estimate. The following relations were used for some of the combined moments:

$$\langle d_x^4 \rangle = \frac{q_{01,4} + q_{32,4} + q_{45,4} + q_{76,4}}{4\Delta x^4}, \quad \text{Equation 40}$$

$$\langle d_y^2 d_z^2 \rangle = \frac{q_{34,3} + q_{25,4} + q_{70,4} + q_{61,4} - 4\langle d_y^4 \rangle \Delta y^4 - 4\langle d_z^4 \rangle \Delta z^4}{24\Delta y^2 \Delta z^2},$$

$$\langle d_x^2 d_y d_z \rangle = \frac{q_{35,4} + q_{42,4} - q_{71,4} - q_{06,4} - q_{34,4} - q_{25,4} + q_{70,4} + q_{61,4}}{48\Delta x^2 \Delta y \Delta z}$$

Similar expressions can be written for other moments. These equations were solved to obtain one estimate for each of the 12 fourth order parameters of return signal over each time interval $[t_0, t_0+T_{av}]$.

The distance factor was used in the form $f_{km}=1$ for estimation of the moments of derivatives. This simplification was chosen to avoid solving non-linear equations which would be the case for $f_{km}$ given by Equations 55, 56.

The moments of spatial derivatives of return signal are primitive indicators for identification of scatterers. Real indicators depend on a goal of identification, i.e., on the criteria to be identified. These real indicators can be the moments themselves, any combination of these moments, or both. For example, if one needs to characterize scatterer's shape, the simplest anisotropy factors can be used as:

$$A_{xy,2} = \frac{\langle d_y^2 \rangle}{\langle d_x^2 \rangle}, A_{xz,2} = \frac{\omega_z^2 \langle d_z^2 \rangle}{\langle d_x^2 \rangle}, A_{yz,2} = \frac{\omega_z^2 \langle d_z^2 \rangle}{\langle d_y^2 \rangle}, \quad \text{Equation 41}$$

$$A_{xy,4} = \frac{\langle d_y^4 \rangle}{\langle d_x^4 \rangle}, A_{xz,4} = \frac{\omega_z^4 \langle d_z^4 \rangle}{\langle d_x^4 \rangle}, A_{yz,4} = \frac{\omega_z^4 \langle d_z^4 \rangle}{\langle d_y^4 \rangle},$$

$$B_{xy,2} = \frac{\langle d_x d_y \rangle}{\sqrt{\langle d_x^2 \rangle \langle d_y^2 \rangle}}, B_{xz,2} = \frac{\langle d_x d_z \rangle}{\sqrt{\langle d_x^2 \rangle \langle d_z^2 \rangle}},$$

$$B_{yz,2} = \frac{\langle d_y d_z \rangle}{\sqrt{\langle d_y^2 \rangle \langle d_z^2 \rangle}}, B_{xy,4} = \frac{3\langle d_x^2 d_y^2 \rangle}{\sqrt{\langle d_x^4 \rangle \langle d_y^4 \rangle}},$$

$$B_{xz,4} = \frac{3\langle d_x^2 d_z^2 \rangle}{\sqrt{\langle d_x^4 \rangle \langle d_z^4 \rangle}}, B_{yz,4} = \frac{3\langle d_y^2 d_z^2 \rangle}{\sqrt{\langle d_y^4 \rangle \langle d_z^4 \rangle}},$$

and so on. Here $\omega_z$ is an isotropy normalization factor that can be applied to obtain $A_{2,2}=A_{3,2}=A_{2,4}=A_{3,4}=\ldots=1$ for isotropic scatterers.

The described procedure was applied to simulated data for the radar with preferred configuration. The second, third, and fourth order moments were calculated by using Equations 38–41 for simulations B–D. Some of the anisotropy factors given by Equation 41 with $\omega_z$ given by Equation 58 are presented in Table 1. The average value and standard deviation of the factors over the total time interval of simulation is shown in the table. One can see that even these simplest indicators provide reliable identification for scatterer's shape. For example, the indicator $A_{xy,4}$ differs more than six times for air scatterers and water pancakes while an error in estimation of this indicator does not exceed 15%.

TABLE 1

Anistropy factors for scatterers of different shape

| indicator | air spheres | water pancakes | ice needles |
|---|---|---|---|
| $A_{xy,2}$ | 1.013 ± 0.103 | 2.552 ± 0.330 | 0.820 ± 0.077 |
| $A_{xz,2}$ | 0.960 ± 0.137 | 1.767 ± 0.208 | 0.871 ± 0.124 |
| $A_{yz,2}$ | 0.952 ± 0.132 | 0.700 ± 0.103 | 1.065 ± 0.147 |
| $A_{xy,4}$ | 1.038 ± 0.125 | 6.587 ± 0.914 | 0.683 ± 0.075 |
| $A_{xz,4}$ | 0.931 ± 0.166 | 3.142 ± 0.450 | 0.770 ± 0.140 |
| $A_{yz,4}$ | 0.909 ± 0.140 | 0.501 ± 0.089 | 1.136 ± 0.163 |
| $B_{xy,4}$ | 1.017 ± 0.050 | 1.480 ± 0.161 | 1.036 ± 0.054 |
| $B_{xz,4}$ | 0.888 ± 0.131 | 0.498 ± 0.061 | 0.976 ± 0.148 |
| $B_{yz,4}$ | 0.892 ± 0.126 | 1.197 ± 0.172 | 0.802 ± 0.113 |

To estimate the three mean wind speed components by using either a general Equation 19 for the second-order structure function, Equation 22 for the fourth order structure function for isotropic field of echoes, or both, four noncoplanary located receivers are required. As explained above, any four noncoplanary located receivers create a pyramid, and only four independent pyramids can be defined for the radar with he preferred configuration although these four pyramids can be defined in many different ways. The four pyramids described above were used to obtain estimates for the mean wind speed components. Two estimates for the wind speed components were obtained from each pyramid: one from the second, and one from the fourth order cross-structure function. For each pyramid, general Equations 13 and 19 for the second order structure functions were analytically simplified, and these simplified equations are:

$$c_{xx}U_x + c_{xy}U_y + c_{xz}U_z = f_x,$$

$$c_{yx}U_x + c_{yy}U_y + c_{yz}U_z = f_y,$$

$$c_{zx}U_x + c_{zy}U_y + c_{zz}U_z = f_z \quad \text{Equation 42}$$

The coefficients $c_{ij}$ and $f_i$, i, j=x, y, z, differ for different pyramids. For the pyramid 1 from receivers 0, 1, 3, and 4, these coefficients are:

$$c_{xx} = c_{yy} = c_{zz} = 1, \quad \text{Equation 43}$$

$$c_{xy} = -\frac{\Delta x_{10}}{2\Delta y_{03}}\left(1 + \frac{q_{30,2}}{q_{01,2}} - \frac{q_{31,2}}{q_{01,2}}\right),$$

$$c_{xz} = -\frac{\Delta x_{10}}{2\Delta z_{40}}\left(1 + \frac{q_{04,2}}{q_{01,2}} - \frac{q_{41,2}}{q_{01,2}}\right),$$

$$c_{yx} = -\frac{\Delta y_{03}}{2\Delta x_{10}}\left(1 + \frac{q_{01,2}}{q_{30,2}} - \frac{q_{31,2}}{q_{30,2}}\right),$$

$$c_{yz} = -\frac{\Delta x_{03}}{2\Delta y_{40}}\left(1 + \frac{q_{04,2}}{q_{30,2}} - \frac{q_{34,2}}{q_{04,2}}\right),$$

$$c_{zx} = -\frac{\Delta z_{40}}{2\Delta x_{10}}\left(1 + \frac{q_{01,2}}{q_{04,2}} - \frac{q_{41,2}}{q_{04,2}}\right),$$

$$c_{zy} = -\frac{\Delta z_{40}}{2\Delta y_{03}}\left(1 + \frac{q_{30,2}}{q_{04,2}} - \frac{q_{34,2}}{q_{04,2}}\right),$$

$$f_x = -\frac{a_{01,2}\Delta x_{10}}{2q_{01,2}}, f_y = -\frac{a_{30,2}\Delta y_{03}}{2q_{30,2}}, f_z = -\frac{a_{04,2}\Delta z_{40}}{2q_{04,2}} \quad \text{Equation 44}$$

Equations 15 and 22 for the fourth order structure function for isotropic field of echoes were also analytically simplified for each pyramid. For the pyramid 1, these simplified equations are:

$$U_x = -\frac{a_{01,4}\Delta x_{10}}{4q_{01,4}}, U_y = -\frac{a_{30,4}\Delta y_{03}}{4q_{30,4}}, \quad \text{Equation 45}$$

$$U_z = -\frac{a_{04,4}\Delta z_{40}}{4q_{04,4}}$$

Similar expressions were applied to the pyramids 2, 3, and 4.

The distance factor was used in the form of Equations 55, 56 at $C_d = \frac{1}{2}$ for estimation of the mean wind speed. These equations were solved to obtain estimates for the wind speed components $U_x$, $U_y$, and $U_z$ from the second and fourth order structure functions for each pyramid over each time interval $[t_0, t_0 + T_{av}]$.

Equations 23 and 24 provide 8 estimates for the turbulence intensity $\sigma_{turb}$ from the auto-structure functions and 28 estimates from the cross-structure functions for the radar with preferred configuration. However, these estimates are not independent although one can obtain as many of these estimates as necessary. Only four estimates of turbulence intensity, one for each of the described above pyramid, were estimated for the simulated data by using the second moment of the time derivative. Equation 23 was used at each time interval $[t_0, t_0 + T_{av}]$ as:

$$\sigma_{turb} = \frac{\lambda}{4\pi}\sqrt{\frac{\langle d_t^2 \rangle}{\langle S^2 \rangle} - 4\left(\frac{\langle d_x^2 \rangle}{\langle S^2 \rangle}U_x^2 + \frac{\langle d_y^2 \rangle}{\langle S^2 \rangle}U_y^2\right)} \quad \text{Equation 46}$$

where estimates for the mean wind speed components and the second moments of the spatial derivatives were taken from each pyramid separately, and the moment $\langle d_t^2 \rangle$ was defined for each pyramid as a mean value of the derivatives from each receiver in this pyramid. For example, it was defined as $$\langle d_t^2 \rangle = (\langle d_{t,0}^2 \rangle + \langle d_{t,1}^2 \rangle + \langle d_{t,3}^2 \rangle + \langle d_{t,4}^2 \rangle)/4 \quad \text{Equation 47}$$

for the pyramid 1, and similarly for other pyramids.

Post-processing of Estimates for the Characteristics of Scatterers

Figure 8A:
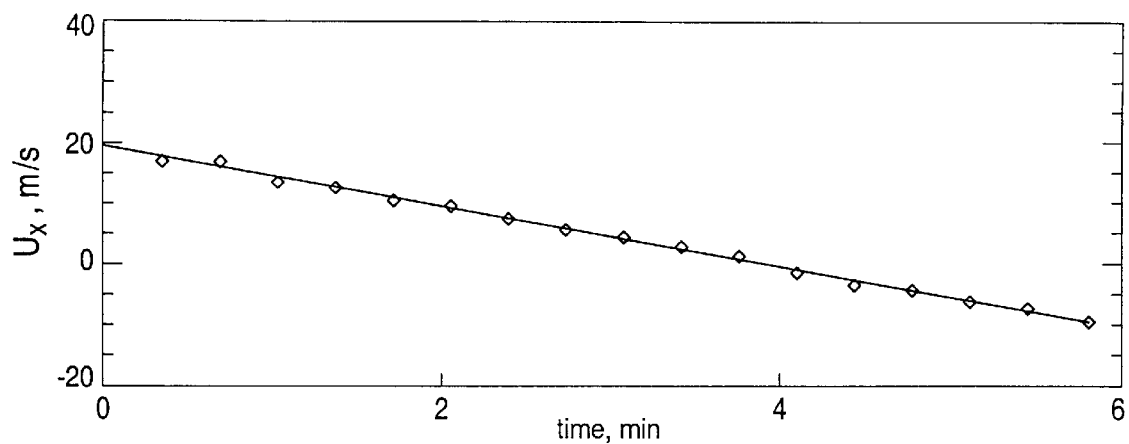
FIGS. 8A–8C illustrate, in graphical form, examples of typical time series of the post-processed mean wind speed components, and the simulated, "true" time series for these components.
Figure 8B:
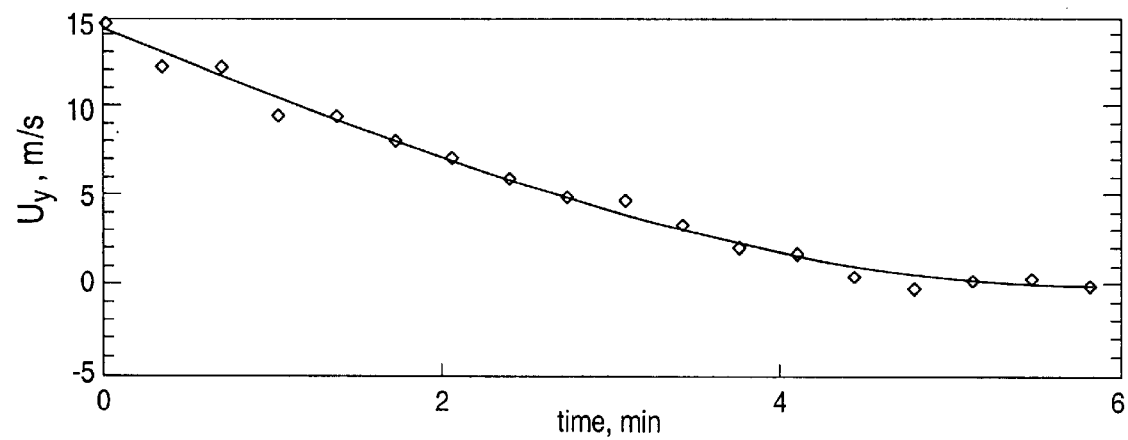
Figure 8C:
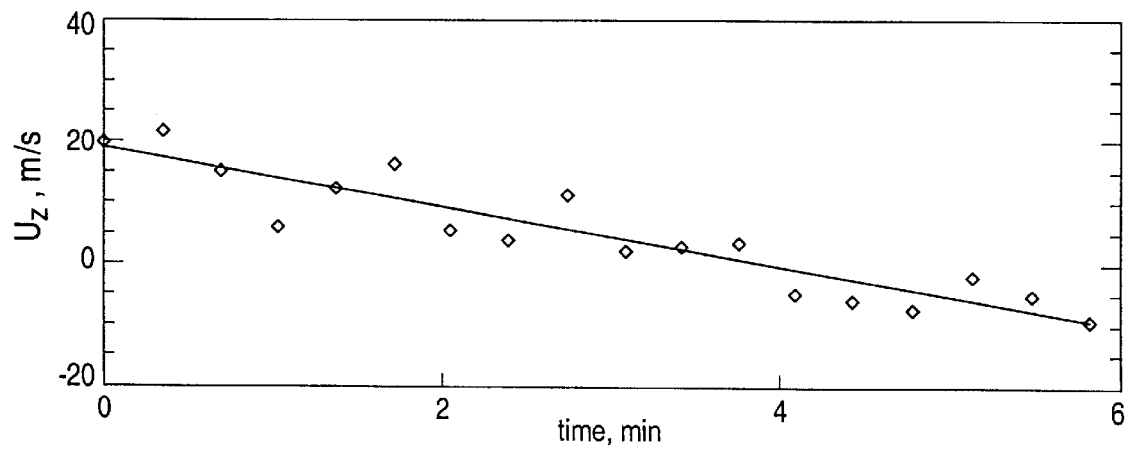

With the simulated data, all four estimates for each mean wind speed component and turbulence intensity were close one to another, and the simplest statistical analysis was applied. The final estimates for each mean wind speed component and turbulence intensity were obtained as average values over four estimates. As an illustration, the time series of the final estimates for the mean wind speed components $U_x(t)$, $U_y(t)$, and $U_z(t)$ from the second order structure functions for simulation A are presented by circles in FIGS. 8A–8C, respectively. The simulated, "true" values for these components are shown by solid lines.

User Display and/or Data Archiving

The return signals noted above were simulated for only one range R, hence the only form of displaying the results is in a form of time series such as those in FIG. 8. For a real remote sensors, numerous forms of data displays are possible, and this is to be defined by users of the system. The same is valid for a data archiving. One can archive only final results after post-processing of the data such as in FIG. 8, all intermediate estimates for each characteristic, or any combination of the above. One can archive data for each range, or just for selected ranges, and so on.

Alternative Components

Type of a remote sensor. A remote sensor can have any wavelength and work as a pulse system, or continuous wave system; this does not affect the method.

Platform. A remote sensor can be mounted on a fixed platform (ground, tower, building, etc.), or moving platform (truck, ship, airplane, satellite, etc.); this does not affect the method.

Scanning strategy. A remote sensor can work in a scanning mode, or in a fixed direction mode (e.g., the wind profiler); this does not affect the method.

Figure 9:
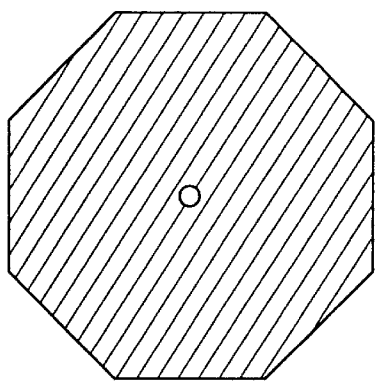
FIGS. 9 and 10 illustrate two configurations of remote sensors for which one can implement the present system for measuring characteristics of scatterers using spaced receiver remote sensors
Figure 9:
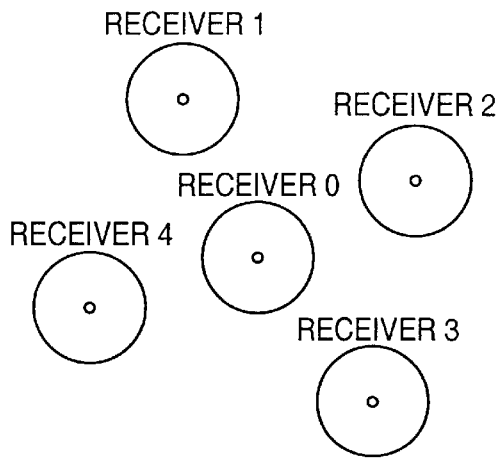
Figure 10:
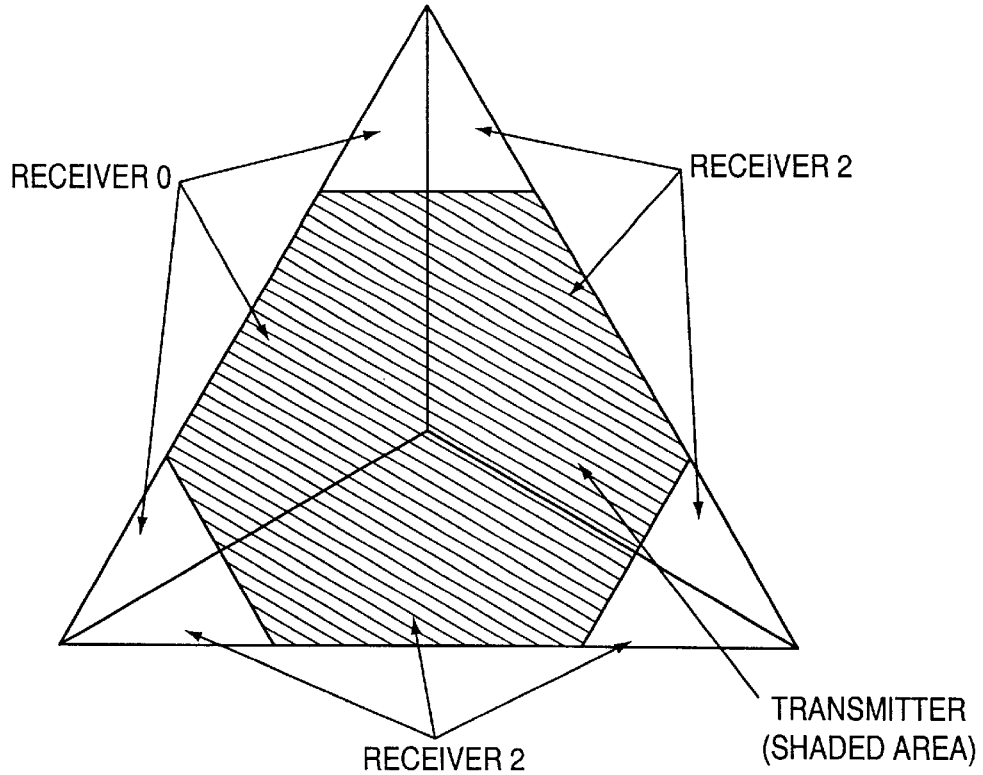

Configuration of a remote sensor. A remote sensor can have antennas of any shape (square, triangle, circle, snowflake, etc.); antennas can be separated (FIG. 9), adjacent (FIG. 10), or overlapping (FIG. 4); antennas can be fully (FIG. 4) or partly used as a transmitter (FIG. 10), or be fully separated from a transmitter (FIG. 9).

Receivers. Signals from different receivers can be signals from different antennas and/or signals from the same antenna obtained from overlapping volumes (see FIGS. 3A, 3B for an illustration); this does not affect the method.

Return signal. A return signal can be the standard complex output from the quadrature-phase synchronous detector, the signal power, or the signal amplitude. The complex signal can be used as is, or converted into the signal power or amplitude. The method is applicable to any one of these types of signals.

Averaging. For remote sensors with large IPP, e.g., lidars, intensive oversampling along the beam is typically used, and averaging is accomplished over a set of adjacent ranges rather than over time. One can use averaging over time, or a combination of temporal and spatial averaging; this does not affect the method.

Equations. The exact equations for arbitrary scatterers are recommended to be used. With proper caution one can, however, use simplified equations for statistically isotropic field of echoes to define the mean speed and speed fluctuations of scatterers if there are serious reasons for doing so. One can use a general form of equations, or analytically simplified form for a specific configuration of a remote sensor. Whatever form of equations is used, this still be the same method.

Domain. Description of the method is presented in a physical (time) domain. The method can as well be re-written in a spectral (frequency) domain similar to that for FCA and FSA; this still be the same method.

Gain factors. The effective gain factors for the odd order $\rho$ can be defined by using exact Equation 6, or approximate Equation 7; this still be the same method.

Turbulence characteristics. One can relate the predetermined turbulence characteristics to calculated parameters of the structure functions as in Equations 23 and 24, one can use proper statistics of the time series of the mean speed components, or one can use any combination of the above approaches; this still be the same method.

Practical Techniques for Calculating the Structure Functions

There are several techniques that can be used to calculate the auto- and cross-structure functions.

(a) One can calculate the functions of any order $\rho$ directly, in accordance with their definition, Equations 1 and 8.

(b) One can calculate the structure functions through the correlation functions. For $\rho=2$, this is a simple and effective procedure given by the equations:

$$D_2(\vec{x}_k,T)=2<s^2(\vec{x}_k,t)>-2$$

$$B(\vec{x}_k,T) \quad \text{Equation 48}$$

$$D_2(\vec{x}_k,\vec{x}_m,T)=<s^2(\vec{x}_k,t)>+g_{km,}^2$$

$$<s^2(\vec{x}_m,t)>-2$$

$$g_{km,2}B(\vec{x}_k,\vec{x}_m,T) \quad \text{Equation 49}$$

where $$B(\vec{x}_k,T)=<s(\vec{x}_k,t)s(\vec{x}_k,t+T)> \quad \text{Equation 50}$$

$$B(\vec{x}_k,t)=<s(\vec{x}_k,t)s(\vec{x}_m,t+T)> \quad \text{Equation 51}$$

At higher order $\rho>2$, relations between the structure and correlation functions are much more complex, and they are not presented here. These relations can still be used although it is not recommended unless there are serious reasons for doing so.

(c) Both the structure functions and the correlation functions can be calculated in a time domain (as in the above definitions, Equations 1, 8, 50, and 51, or by using the Fourier transform. The latter way can be much faster when large enough $T_{amax}$ and $T_{cmax}$ are used. Calculations can be accomplished on a computer, by using microprocessor, or in any other way.

If a real return signal is used (the signal power or amplitude), both the right-hand-side time series $s(\vec{x}_k,t)$, $s(\vec{x}_k,t)$ and the left-hand-side functions D and B in Equations 1, 8, 48–51 are real values. The complex return signal $\{I(\vec{x}_k,t), Q(\vec{x}_k,t)\}$ can be used in two ways.

(d) One can calculate the signal power $P(\vec{x}_k,t)$ or amplitude $A(\vec{x}_k,t)$ as:

$$P(\vec{x}_k,t)=[I(\vec{x}_k,t)-<I(\vec{x}_k,t)<]^2+[Q(\vec{x}_k,t)-<Q(\vec{x}_k,t)<]^2 \quad \text{Equation 52}$$

$$A(\vec{x}_k,t)=\sqrt{[I(\vec{x}_k,t)-\langle I(\vec{x}_k,t)\rangle]^2+[Q(\vec{x}_k,t)-\langle Q(\vec{x}_k,t)\rangle]^2} \quad \text{Equation 53}$$

from $\{I(\vec{x}_k,t), Q(\vec{x}_k,t)\}$ in the very start (before either step (a) or (c) in the pre-processing of the signals), and then treat any of them as the above described real signal $s(\vec{x}_k,t)$.

(e) One can calculate the complex correlation functions according to the standard definition, and then use the absolute values of these complex correlation functions as B in Eqs. 50, 51 to calculate the structure functions by using Equations 48, 49, and similar equations at higher $\rho>2$.

Whatever technique (a)–(e), or any combination of these techniques is used, this does not affect the method.

Practical Techniques for Estimating the Moments of Noise

There are several techniques that can be used for estimating the moments of noise of even order $<n^{2i}(\vec{x}_k,t)>$, $i=1, 2, \ldots$ (a) One can use directly Equation 2 at any two small values of T, e.g., at $T_1=\Delta t$ and $T_2=2\Delta t$, to calculate $<n^{2i}(\vec{x}_k,t))$.

(b) One can calculate several estimates for $<n^{2i}(\vec{x}_k,t)>$ at any $i \geq 1$ by using several pairs of time separations, e.g., $T_1=\Delta t$, $T_2=2\Delta t$; $T_1=2\Delta t$, $T_2=3\Delta t$; $T_1=3\Delta t$, $T_2=4\Delta t$ until $T \leq T_{amax}$, and then apply any statistics of these estimates (average, or median, etc.) as the moments of noise for the receiver $\vec{x}_k$.

(c) As this is accomplished in the Atmospheric Example of the System, one can use the structure functions $D_{2i}(\vec{x}_k,t)$ at three, or more time separations, e.g., at $T=\Delta t$, $2\Delta t$, $3\Delta t$, and so on, until $T \leq T_{amax}$, and then define $<n^{2i}(\vec{x}_k,t)$ from the best fit to measured data in accordance with the theoretical Equation 2.

Whatever technique (a)–(c), or any combination of these techniques is used, this does not affect the method.

Practical Techniques for Estimation of $q_{km,\rho}$, $a_{km,\rho}$, and $b_{km,\rho}$ There are several techniques that can be used for calculation of the parameters $q_{km,\rho}$, $a_{km,\rho}$, $b_{km,\rho}$ as well as the higher-order factors in a decomposition of the cross-structure functions $D_\rho(\vec{x}_k, \vec{x}_m, T)$ at $T \to 0$ in accordance with Equations 9 and 10.

(a) One can use directly the equations 9 and 10 at as many small separations T as the number of parameters to be defined, e.g., at three separations for estimating three parameters $q_{km,\rho}$, $a_{km,\rho}$, and $b_{km,\rho}$.

(b) One can calculate several estimates for each parameter by using several combinations of time separations, and then apply any statistics of these estimates (average, or median, etc.) as the parameters $q_{km,\rho}$, $a_{km,\rho}$, $b_{km,\rho}$, and so on for the receivers $\vec{x}_k$ and $\vec{x}_m$.

(c) As this is accomplished in the Atmospheric Example of the System, one can use the structure function $D_\rho(\vec{x}_k, \vec{x}_m, T)$ at more time separations $|T| \leq T_{cmax}$ than the number of parameters to be defined, and then define parameters $q_{km,\rho}$, $a_{km,\rho}$, $b_{km,\rho}$, and so on from the best fit to measured data in accordance with theoretical Equations 9 and 10.

(d) For a remote sensor with non-overlapping antennas, one can estimate $q_{km,\rho}$ directly by using Equations 11 and 12. However, this technique can provide erroneous estimates for $q_{km,\rho}$ if return signals for receivers $\vec{x}_k$ and $\vec{x}_k$ contain correlated noise with zero correlation lag. Hence, the structure function $D_\rho(\vec{x}_k, \vec{x}_k, 0)$ should be used with a proper caution, and it is not recommended to be used at all unless there are serious reasons for doing so.

Whatever technique (a)–(d), or any combination of these techniques is used, this does not affect the method.

Practical Limits for $T_{amax}$ and $T_{cmax}$

These limits must satisfy the conditions $$T_{amax} \leq T_{max}^{theor}, \quad T_{cmax} \leq T_{max}^{theor} \qquad \text{Equation 54}$$

where $T_{max}^{theor}$ is given by Equation 27. It is recommended, although it is not necessary to use $T_{cmax} \leq T_{amax}$.

The practical limits are mainly defined by a technique that is chosen for analysis of the structure functions. If techniques (a) noted above are chosen, $T_{amax}=2\Delta t$ and $T_{cmax}=\Delta t$ are sufficient.

For other techniques, $T_{amax}=T_{max}^{theor}$ and $T_{cmax}=(0.6-0.8)T_{max}^{theor}$ are recommended. If $T_{max}^{theor}$ is very large, say greater than $10\Delta t$, one can use smaller limits, e.g., $T_{amax} \approx (6-10)\Delta t$ and $T_{cmax} \approx (4-6)\Delta t$.

Whatever limits are used, this does not affect the method until the conditions specified in Equation 54 are satisfied.

Estimation of the Distance Factor $f_{km}$

A new theory behind the method is exact just asymptotically at $|\vec{x}_k - \vec{x}_m| \to 0$. To apply the theory to practical measurements, correction for a finite distance between receivers should be made, and the distance factor is to provide such a correction. Indeed, $\Delta \vec{x}_{km}$ defines the effective separation between receivers $\vec{x}_k$ and $\vec{x}_m$ contrary to their physical separation $\vec{x}_k - \vec{x}_m$. The distance factor $f_{km}$ mainly depends on characteristics of a remote sensor (location of receivers $\vec{x}_k$ and $\vec{x}_k$, location of a transmitter with respect to the receivers, and so on) although it may also slightly depend on characteristics of scatterers. There are several ways to estimate the distance factor $f_{km}$ for receivers $\vec{x}_k$ and $\vec{x}_m$.

(a) Because the factor is mainly defined by characteristics of a remote sensor, one can consider $f_{km}$ as a constant calibration factor. If one chooses to apply this approach, the factor should be estimated just once for each type of a remote sensor for each pair of receivers, either theoretically or experimentally.

(b) To take into account a dependence of the distance factor on characteristics of scatterers (their shape, spatial distribution in the illuminated volume, etc.), one can present the factor as:

$$f_{km} C_d f_{km}^{(d)} \qquad \text{Equation 55}$$

Here $C_d \approx 0.5-1$ is a constant calibration factor. It may depend on a shape of antennas, and other characteristics of a remote sensor. It should be defined just once for each type of remote sensor. On the contrary, $f_{km}^{(d)}$ is a dynamic distance function. Its value should be calculated for each pair of receivers $\vec{x}_k$ and $\vec{x}_m$ at each range R for each time interval $[t_0, t_0+T_{av}]$. There is no exact expression for this function although there are two basic approaches to its derivation.

(c) One can derive this function by using some models for a remote sensor and a scattering field. In this case, the relation would be formally exact and unique while strongly dependent on chosen models.

(d) One can use qualitative physical analysis for such derivation. In this case, the relation would be approximate while it might be universal. For example, the following expression can be obtained by using this approach:

$$f_{km}^{(d)} = \frac{2}{1 + \rho(\vec{x}_k, \vec{x}_m)} \qquad \text{Equation 56}$$

where the correlation coefficient $\rho(\vec{x}_k, \vec{x}_m)$ between signals from receivers $\vec{x}_k$ and $\vec{x}_m$ at zero separation lag is given by Equation 25. Other expressions can also be obtained for $f_{km}^{(d)}$ by using qualitative physical analysis.

The coefficient $\rho(\vec{x}_k, \vec{x}_m)$ can be calculated directly according to its definition, Equation 25, or through the parameter $q_{km,2}$ as:

$$\rho(\vec{x}_k, \vec{x}_m) = \frac{\langle s^2(\vec{x}_k, t)\rangle + g_{km}^2 \langle s^2(\vec{x}_m, t)\rangle - q_{km,2}}{2 g_{km,2} \sqrt{\langle s^2(\vec{x}_k, t)\rangle \langle s^2(\vec{x}_m, t)\rangle}} \quad \text{Equation 57}$$

(e) One can use either different, or the same expression for the distance factor $f_{km}$ to estimate the moments of spatial derivatives with Equations 13–15 and similar equations for $\rho>2$ and to estimate the mean speed components with Equations 19, 21, 22, and similar equations for $\rho>2$.

Whatever approach (a)–(e) as well as whatever physically substantiated expression for $f_{km}$ is used, this does not affect the method.

Practical Limits for an Order $\rho$ to be Used

The method relates parameters of the auto- and cross-structure functions of any order $\rho \geq 2$ at $|\vec{x}_k - \vec{x}_m| \to 0$ and $T \to 0$ to different characteristics of scatterers. It is well known that an accuracy of calculation of a structure function decreases with increasing $\rho$, and it is much poorer for the odd $\rho$ than for even ones. For this reason, a general recommendation is to use a low order structure functions whenever is possible. In practice, the lower limit for $\rho$ depends on characteristics of scatterers to be determined. For example, if one needs only the mean speed of scatterers and turbulence intensity, the second order structure functions are sufficient. These functions also provide a limited set of indicators for identification of scatterers. However, if the identification is the major, or a high priority task, one is recommended to use the higher order structure functions, at least at $\rho=2-4$. Whatever order(s) of equations is used, this does not affect the method.

Practical Limits for a Number of Equations to be Used

Spaced receiver remote sensor with $N_r$ receivers provides $N_{eq}=N_r(N_r-1)/2$ pairs, hence, one can calculate up to $N_{eq}$ cross-structure functions. If $N_r>4$, one can obtain several estimates for some characteristics of scatterers by using all these functions. However, only estimates from fully different groups of receivers are theoretically independent. There are three approaches to choosing a number of estimates for each characteristic of scatterers, and, consequently, to a number of equations to be used.

(a) One can use only theoretically independent estimates. In this case, one can calculate only the cross-structure functions that are necessary to obtain these estimates. Note that a number of independent estimates as well as a number of necessary cross-structure functions depend on a configuration of a remote sensor.

(b) One can use all estimates that can be obtained. In this case, one should calculate all possible cross-structure functions.

(c) One can use any intermediate number of estimates between maximum possible and theoretically independent values. In this case, one can calculate only necessary cross-structure functions to obtain the predetermined number of estimates.

Whatever approach (a)–(c) is used, this does not affect the method.

Estimation of the Normalization Factor $\omega_z$

The rates of change in return signal with a receiver being moved along the beam and normally to the beam are quite different because of different physics behind these changes. For this reason, the anisotropy factors $A_{xz,2}$, $A_{yz,2}$, $A_{xz,4}$, $A_{yz,4}$, and other similar factors are not equal to unity for scatterers of isotropic, spherical shape. There are two basic approaches to this situation.

(a) If one needs to know only relative changes in the anisotropy factors for a predetermined identification, a value $\omega_z=1$ can be used.

(b) if one needs the anisotropy factors being unity for isotropic scatterers, the normalization factor $\omega_z$ should be defined and applied. The exact approach to defining this factor is by using a general equation for a return signal for a remote sensor with separated transmitter and receiver. Another approach is to use a qualitative physical analysis. In the latter case, different formulae can be derived depending on adopted assumptions. For example, one can derive the following relation for the remote sensor with the preferred configuration:

$$\omega_z = 2\pi \sqrt{\frac{\delta x^2 + \delta y^2}{2\lambda^2} D_T^2 - \frac{D_R^2}{D_T^2 + D_R^2}} \quad \text{Equation 58}$$

Whatever approach (a) or (b) as well as whatever physically substantiated expression for $\omega_z$ is used, this does not affect the method.

SUMMARY

The system for measuring characteristics of scatterers by spaced receiver remote sensors removes the limitations of poor spatial resolution and poor temporal resolution that are found in existing monitoring equipment. The key feature of the system for measuring characteristics of scatterers using spaced receiver remote sensors is the use of structure functions for the return signals to determine the characteristics of the scatterers from the return signals, instead of using correlation functions or the spectra of the return signals. This allows the system for measuring characteristics of scatterers using spaced receiver remote sensors to remove the above-noted limitations of: the usage of strong assumptions, the inability to apply correlation-function-based methods to overlapping receivers, indirect estimation of parameters of return signals that are used for turbulence measurements, the need to deploy a dual-polarization remote sensor for identification of scatterers. The system for measuring characteristics of scatterers using spaced receiver remote sensors also significantly mitigates, if not removes, the limitation of contamination of the results by ground clutter and/or hard targets. The system for measuring characteristics of scatterers using spaced receiver remote sensors is based on a newly developed, asymptotically exact theory for the local structure of the return signals for remote sensors.

What is claimed is:

1. A system for determining predetermined characteristics of scatterers extant in a predetermined volume of space, wherein said scatterers have at least one predetermined characteristic, comprising:

sensor means being capable of transmitting signals and receiving components of transmitted signals of known characteristics that are reflected from said scatterers wherein said scatterers are illuminated by a radio, acoustic, or light frequency signal transmitted in a beam pattern and wherein the sensor means comprises at least two receivers separated in at least one of a spatial dimension and directed to concurrently view said scatterers; and means for processing said received components reflected from said scatterers using the structure functions for said received components to obtain data indicative of at least one of said predetermined characteristics of said scatterers.

2. The system for determining predetermined characteristics of scatterers of claim 1 wherein a remote sensor, comprising a pulse wave, or continuous wave transmitter, generates said transmitted signal, and said reflected components from said scatterers comprise a pure return signal component and a contamination component, said means for processing said received components comprises:

means for calculating an auto structure function for each of said at least two spatially separated receivers; and means for calculating a cross-structure function for each pair of said at least two spatially separated receivers.

3. The system for determining predetermined characteristics of scatterers of claim 2 wherein said means for processing said received components further comprises:

means, responsive to said auto structure function and said cross-structure function, for generating said data indicative of at least one of said predetermined characteristics of said scatterers.

4. The system for determining predetermined characteristics of scatterers of claim 3 wherein said means for processing said received components further comprises:

means, responsive to said auto structure functions, for generating zero order coefficients to provide the moments of noise and effective gain factors of predetermined order.

5. The system for determining predetermined characteristics of scatterers of claim 3 wherein said means for processing said received components further comprises:

means, responsive to said cross-structure functions, for generating zero order coefficients to provide indicators for the predetermined identification of scatterers.

6. The system for determining predetermined characteristics of scatterers of claim 3 wherein said means for processing said received components further comprises:

means, responsive to said cross-structure functions, for generating first order coefficients to provide the mean speed components of said scatterers.

7. The system for determining predetermined characteristics of scatterers of claim 3 wherein said means for processing said received components further comprises:

means, responsive to said auto structure functions and said cross-structure functions, for generating second order coefficients to provide estimates for turbulence characteristics of said scatterers.

8. The system for determining predetermined characteristics of scatterers of claim 2 wherein said means for processing said received components comprises:

means for pre-processing said received components to reduce said contamination component.

9. The system for determining predetermined characteristics of scatterers of claim 8 wherein said means for pre-processing said received components comprises:

means for executing at least one process on said received components to reduce said contamination component from the class of processes including: filtering of the random noise from said received components, using a clutter removal algorithm(s) on said received components, removing the mean values from said received components, normalizing said received components.

10. The system for determining predetermined characteristics of scatterers of claim 3 wherein said means for processing said received components further comprises:

means for post-processing said determined characteristics using a post processing algorithm from the class of processing algorithms including: statistical analysis of all obtained estimates for the predetermined characteristics of the scatterers where said remote sensor can produce several estimates for some characteristics, joint statistical analysis of said characteristics of said scatterers at the analyzed time interval with those from the previous time interval(s), joint statistical analysis of said characteristics of the scatterers at the analyzed range with those from other close enough ranges, and identification of said scatterers in accordance with predetermined requirements by using a set of measured indicators.

11. The system for determining predetermined characteristics of scatterers of claim 1 wherein said sensor means comprises:

at least two spatially separated antennas, separated along a direction comprising a path said reflected components from said scatterers travel to said sensor means, and said at least two spatially separated antennas being focused on the same range.

12. The system for determining predetermined characteristics of scatterers of claim 1 wherein said sensor means comprises:

a single antenna which obtains at least two signals at slightly separated yet overlapping ranges.

13. The system for determining predetermined characteristics of scatterers of claim 1 further comprising:

means, responsive to said data indicative of at least one of said predetermined characteristics of said scatterers, for displaying and/or archiving said determined characteristics.

14. A method for determining predetermined characteristics of scatterers extant in a predetermined volume of space, wherein said scatterers have at least one predetermined characteristic, comprising the steps of:

activating a sensor that is capable of transmitting signals and receiving components of transmitted signals of known characteristics that are reflected from said scatterers wherein said scatterers are illuminated by a radio frequency signal transmitted in a beam pattern and wherein said step of activating comprises receiving said components from at least two receivers separated in at least one of a spatial dimension and directed to concurrently view said scatterers; and processing said received components reflected from said scatterers using the structure functions for said received components to obtain data indicative of at least one of said predetermined characteristics of said scatterers.

15. The method for determining predetermined characteristics of scatterers of claim 14 wherein a remote sensor, comprising a pulse wave, or continuous wave transmitter, generates said transmitted signal, and said reflected components from said scatterers comprise a pure return signal component and a contamination component, said step of processing said received components comprises:

calculating an auto structure function for each of said at least two spatially separated receivers; and calculating a cross-structure function for each pair of said at least two spatially separated receivers.

16. The method for determining predetermined characteristics of scatterers of claim 15 wherein said step of processing said received components further comprises:

generating, in response to said auto structure function and said cross-structure function, said data indicative of at least one of said predetermined characteristics of said scatterers.

17. The method for determining predetermined characteristics of scatterers of claim 16 wherein said step of processing said received components further comprises:

generating, in response to said auto structure functions, zero order coefficients to provide the moments of noise and effective gain factors of predetermined order.

18. The method for determining predetermined characteristics of scatterers of claim 16 wherein said step of processing said received components further comprises:

generating, in response to said auto cross-structure functions, zero order coefficients to provide indicators for the predetermined identification of scatterers.

19. The method for determining predetermined characteristics of scatterers of claim 16 wherein said step of processing said received components further comprises:

generating, in response to said cross-structure functions, first order coefficients to provide the mean speed components of said scatterers.

20. The method for determining predetermined characteristics of scatterers of claim 16 wherein said step of processing said received components further comprises:

generating, in response to said auto structure functions and said cross-structure functions, second order coefficients provide estimates for turbulence characteristics of said scatterers.

21. The method for determining predetermined characteristics of scatterers of claim 15 wherein said step of processing said received components comprises:

pre-processing said received components to reduce said contamination component.

22. The method for determining predetermined characteristics of scatterers of claim 21 wherein said step of pre-processing said received components comprises:

executing at least one process on said received components to reduce said contamination component from the class of processes including: filtering of the random noise from said received components, using a clutter removal algorithm(s) on said received components, removing the mean values from said received components, normalizing said received components.

23. The method for determining predetermined characteristics of scatterers of claim 18 wherein said step of processing said received components further comprises:

post-processing said determined characteristics using a post processing algorithm from the class of processing algorithms including: statistical analysis of all obtained estimates for the predetermined characteristics of the scatterers where said remote sensor can produce several estimates for some characteristics, joint statistical analysis of said characteristics of said scatterers at the analyzed time interval with those from the previous time interval(s), joint statistical analysis of said characteristics of the scatterers at the analyzed range with those from other close enough ranges, and identification of said scatterers in accordance with predetermined requirements by using a set of measured indicators.

24. The method for determining predetermined characteristics of scatterers of claim 14 wherein said step of activating comprises:

receiving said components from at least two spatially separated antennas, separated along a direction comprising a path said reflected components from said scatterers travel to said at least two spatially separated antennas, and said at least two spatially separated antennas being focused on the same range.

25. The method for determining predetermined characteristics of scatterers of claim 14 wherein said step of activating comprises:

a single antenna which obtains at least two signals at slightly separated yet overlapping ranges.

26. The method for determining predetermined characteristics of scatterers of claim 14 further comprising the step of:

displaying and/or archiving, in response to said data indicative of at least one of said predetermined characteristics of said scatterers, said determined characteristics.

* * * * *

UNITED STATES PATENT AND TRADEMARK OFFICE
CERTIFICATE OF CORRECTION

PATENT NO. : 6,512,996 B1
DATED : January 28, 2003
INVENTOR(S) : Alexander A. Praskovsky and Eleanor A. Praskovskaya It is certified that error appears in the above-identified patent and that said Letters Patent is hereby corrected as shown below:

<u>Title page, Item [54] and Column 1, lines 1-3,</u>
Should read:
-- SYSTEM FOR MEASURING CHARACTERISTICS OF SCATTERERS USING SPACED RECEIVER REMOTE SENSORS --

Signed and Sealed this

Twenty-seventh Day of May, 2003

JAMES E. ROGAN
*Director of the United States Patent and Trademark Office*